(12) United States Patent
Yu et al.

(10) Patent No.: US 11,296,772 B2
(45) Date of Patent: Apr. 5, 2022

(54) METHODS AND DEVICES FOR TRANSMIT BEAMSWEEPING WITH PAYLOAD DATA

(71) Applicant: Intel Corporation, Santa Clara, CA (US)

(72) Inventors: Zhibin Yu, Unterhaching (DE); Bertram Gunzelmann, Koenigsbrunn (DE); Francois Deparis, Zirndorf (DE); Qing Xu, Unterhaching (DE)

(73) Assignee: INTEL CORPORATION, Santa Clara, CA (US)

( * ) Notice: Subject to any disclaimer, the term of this patent is extended or adjusted under 35 U.S.C. 154(b) by 72 days.

(21) Appl. No.: 16/929,125

(22) Filed: Jul. 15, 2020

(65) Prior Publication Data

US 2021/0050898 A1 Feb. 18, 2021

(30) Foreign Application Priority Data

Aug. 16, 2019 (EP) .................................... 19192046

(51) Int. Cl.
*H04B 7/06* (2006.01)
*H04L 1/00* (2006.01)
(52) U.S. Cl.
CPC ......... *H04B 7/0695* (2013.01); *H04B 7/0623* (2013.01); *H04L 1/0008* (2013.01)
(58) Field of Classification Search
CPC ............... H04B 7/0617; H04B 7/0619; H04B 7/0623
See application file for complete search history.

(56) References Cited

U.S. PATENT DOCUMENTS

| 2007/0232359 A1 | 10/2007 | Pinheiro et al. |
| 2014/0293770 A1 | 10/2014 | Liu et al. |
| 2019/0313384 A1* | 10/2019 | John Wilson ......... H04L 5/0053 |

FOREIGN PATENT DOCUMENTS

| EP | 1229669 A1 | 8/2002 |
| EP | 2399345 B1 | 12/2011 |
| EP | 2834923 B1 | 2/2015 |
| EP | 2852075 A1 | 3/2015 |

OTHER PUBLICATIONS

European search report issued for corresponding European patent application EP 19 192 046.1 dated Apr. 28, 2020, 14 pages (for informational purpose only).

* cited by examiner

*Primary Examiner* — Kevin Kim
(74) *Attorney, Agent, or Firm* — Viering, Jentschura & Partner MBB

(57) ABSTRACT

A wireless device includes a radio frequency transceiver, an antenna array, and one or more processors configured to transmit and receive signals with the radio frequency transceiver and the antenna array, and further configured to transmit, with a first antenna beam, a first plurality of blocks of payload data, transmit, with a second antenna beam, a second plurality of blocks of payload data, receive from a receiver device, feedback on the first plurality of blocks and the second plurality of blocks that requests retransmission or transmit power adjustments, select, based on the feedback, an antenna beam as a transmit antenna beam, and transmit payload data to the receiver device with the transmit antenna beam.

20 Claims, 11 Drawing Sheets

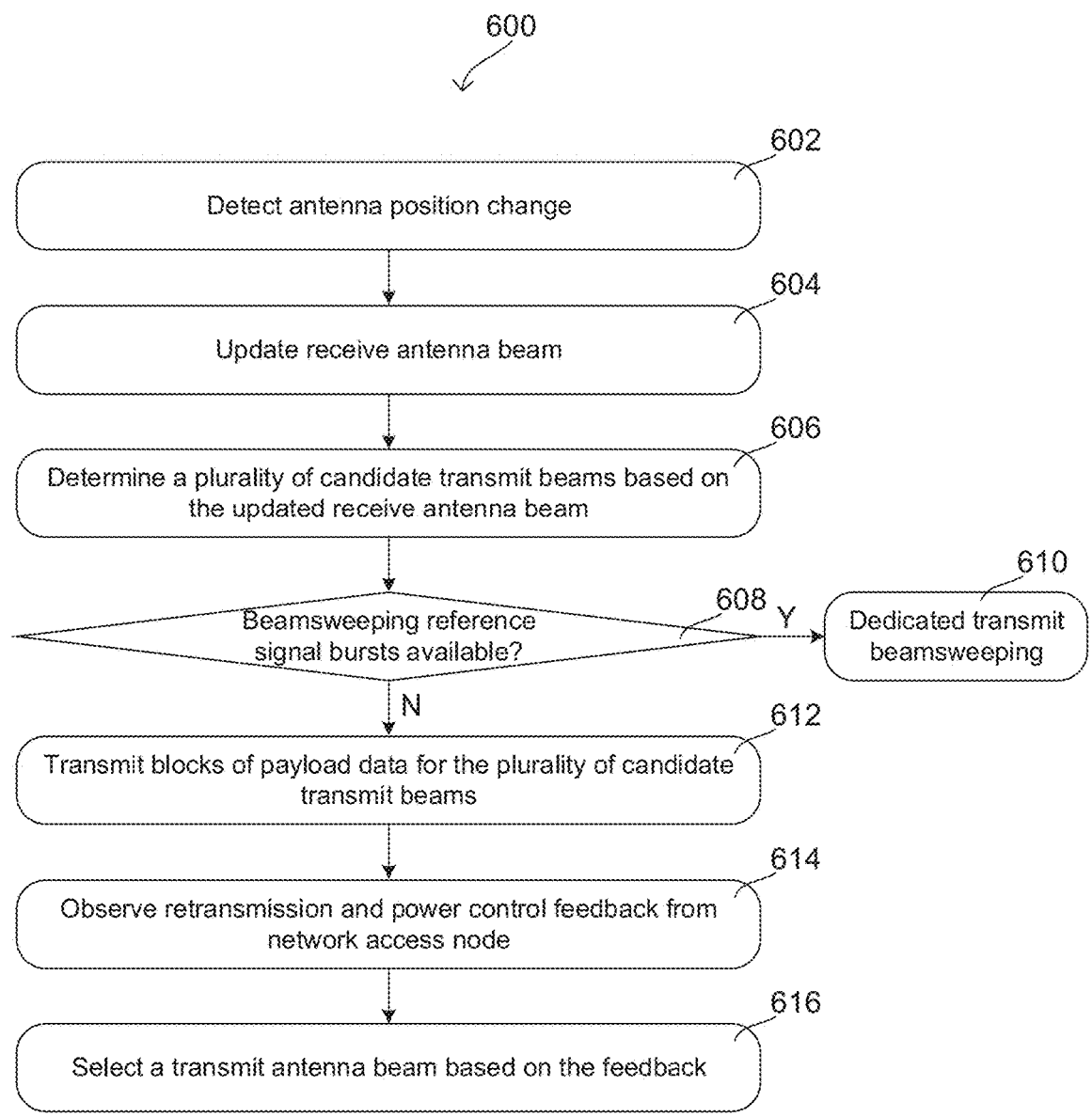

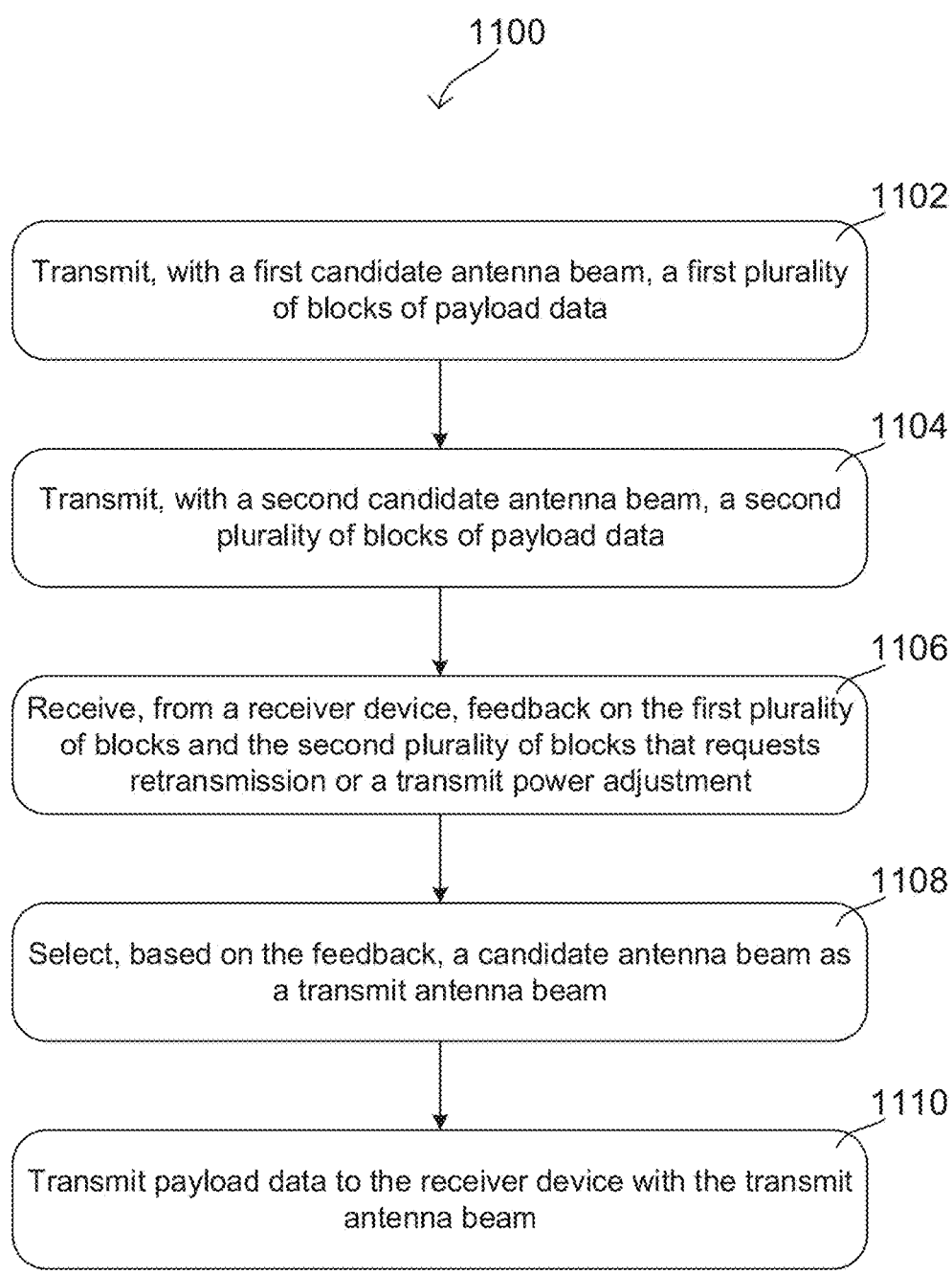

METHODS AND DEVICES FOR TRANSMIT BEAMSWEEPING WITH PAYLOAD DATA

CROSS-REFERENCE TO RELATED APPLICATIONS

This application claims priority to European Application No. 19 192 046.1 filed on Aug. 16, 2019, which is incorporated by reference in its entirety.

TECHNICAL FIELD

Various aspects relate generally to methods and devices for transmit beamsweeping with payload data.

BACKGROUND

Radio access technologies such as WiGiG and Fifth Generation (5G) New Radio (NR) use beamforming to compensate for the higher pathloss at high frequency carriers. To use beamforming, a device applies different weights to different elements of antenna array. When the device wirelessly transmits with that antenna array, the resulting radio signals form a radiation pattern of constructive and destructive interference. By adjusting the weights, the device may therefore steer its antenna radiation pattern in specific directions, such as in the direction of a target device. Devices can also use beamforming in the receive direction with a similar technique. For example, a device may receive with an antenna array, apply different weights to the signals received by the different elements, and then combine the weighted signals. Depending on the weights at each element, the resulting combined signal will be more sensitive in certain directions around the device. Like in the transmit case, the device can steer its antenna radiation pattern to receive signals in a certain direction.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 6 shows an exemplary flow chart for a method of transmit beamsweeping with payload data according to some aspects;

FIG. 11 shows an exemplary method of performing transmit beamsweeping at a wireless device according to some aspects.

DESCRIPTION

Figure 1:
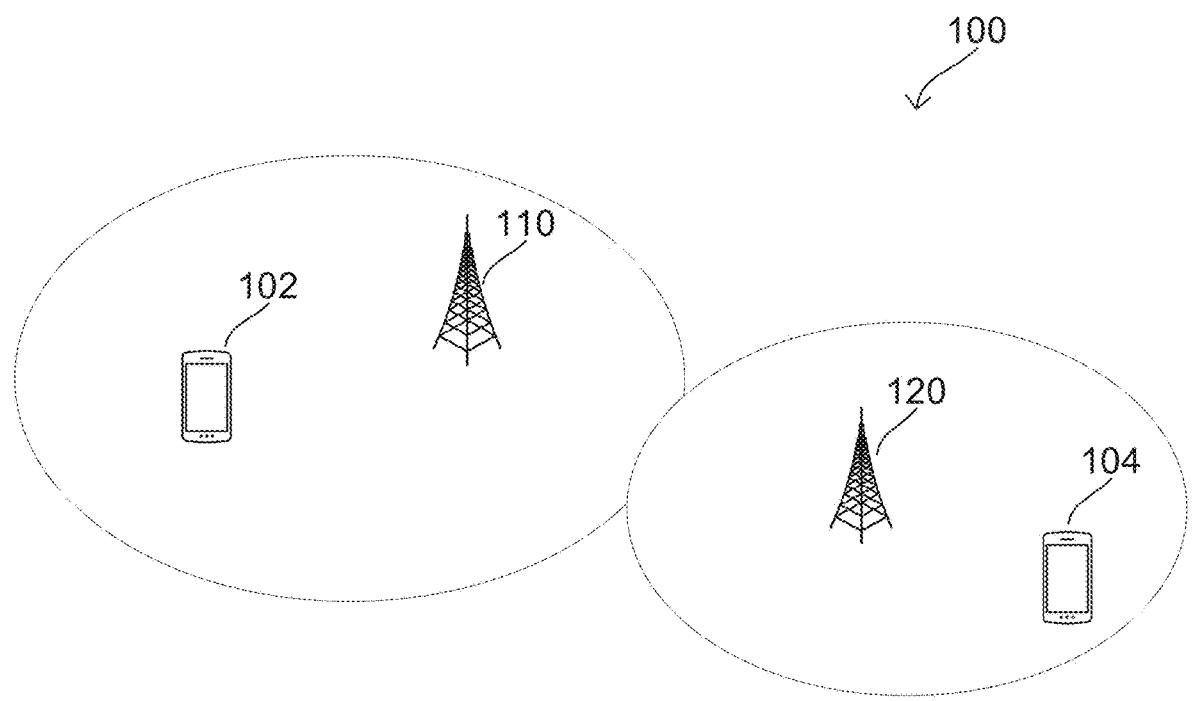
FIG. 1 shows an exemplary radio communication network according to some aspects.

The following detailed description refers to the accompanying drawings that show, by way of illustration, specific details and aspects of aspects in which the disclosure may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the wireless transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

Many wireless communication technologies use beamforming to increase link strength between transmitter and receiver. The Third Generation Partnership Project's (3GPP) Fifth Generation (5G) New Radio (NR) standard, for example, includes mechanisms for beamforming in both the transmit and receive directions. Focusing on the terminal side, a terminal device (e.g., a UE) may identify a receive antenna beam and a transmit antenna beam for a given network access node (e.g., gNodeB). In the receive direction, the terminal device can then increase link strength by receiving signals from the network access node with the receive antenna beam. Similarly, in the transmit direction the terminal device can boost link strength by transmitting signals to the network access node with the transmit antenna beam.

Some terminal device manufacturers initially assumed that terminals could select transmit antenna beams (e.g., for mmWave bands) using beam correspondence. That is, once a terminal device performed beamsweeping to identify a receive antenna beam, it could then use a transmit antenna beam that overlaps spatially with the receive antenna beam—in other words, a transmit antenna beam that corresponded with the receive antenna beam. Assuming uplink and downlink channel reciprocity, the terminal device would not need to perform a dedicated transmit beamsweeping procedure to determine the transmit antenna beam; it could instead directly derive the transmit antenna beam from the receive antenna beam that it already acquired. Because transmit beamsweeping requires extra radio resources (both for beamsweeping and for the network access node to send feedback), beam correspondence can avoid extra radio resource allocation in the network side.

However, despite its benefits, beam correspondence may have drawbacks in practice. In real-world use cases, a terminal device's transmit and receive circuitry will not be ideal. This means a transmit antenna beam may operate differently from a receive antenna beam, even if they are steered in the same direction. For instance, a terminal device's transmit phase shifters may be implemented differently from its receive phase shifters, or its internal design may have other imperfections that lead to differences between the transmit and receive paths. As a result, it can be both challenging and expensive for vendors to design an ideal terminal device that can support full beam correspondence, especially in high frequency bands like 5G mmWave.

Accordingly, when real-world terminal devices operate, their transmit antenna beams may not overlap perfectly with the best receive antenna beam obtained from beamsweeping, even if the transmit and receive antenna beams are theoretically identical. Moreover, when the terminal device transmits with the transmit antenna beam, the equivalent isotropically radiated power (EIRP) may not be optimally focused in the desired direction, leading to sub-optimal uplink performance.

Though 3GPP discussions to date have tried to address these potential issues, the proposed solutions are still not ideal. For instance, 3GPP discussions have proposed that a terminal device can choose to support either full beam correspondence or partial beam correspondence. When operating, a terminal device can indicate its capability to the network. If the terminal device supports full beam correspondence, it is assumed that it can reuse the same receive antenna beam in the transmit direction. As discussed above, it can be very complex and expensive to manufacture devices that meet this criteria.

On the other hand, terminal devices that only support partial beam correspondence may use transmit beamsweeping to meet the beam correspondence accuracy requirements. While these devices may be less complex and expensive, they may use extra network resources and consume additional power. Specifically, the network will schedule specific reference signal resources for the terminal device (e.g., beam management (BM) sounding reference signal (SRS) resources for 5G NR). The terminal device transmits these reference signal resources as scheduled, using different transmitting antenna beams for different reference signal resources. The serving network access node then measures the reference signal resources and reports back to the terminal device which reference signal resources. Based on that feedback, the terminal device can identify which transmit antenna beam produced the strongest radio link and then select that transmit antenna beam for transmitting to the network access node.

Though effective, transmit beamsweeping requires extra radio resources for the reference signals and increases device power consumption. Moreover, like in 3GPP NR, the terminal device may not be able to dynamically trigger transmit beamsweeping. That is, the network may have complete discretion in triggering transmit beamsweeping for the terminal device, and may only allocate reference signal resources (e.g., BM SRS for NR) to the terminal device periodically. As a result, even if the terminal device knows that it should update its transmit antenna beam, it may not be able to trigger transmit beamsweeping on its own. For instance, the terminal device may update its receive antenna beam with receive beamsweeping, which likely means that it should also update its transmit antenna beam. However, since the network will not know when the terminal device's receive antenna beam changes, the network may not immediately trigger transmit beamsweeping. The terminal device may thus not be able to refine its transmit antenna beam using beamsweeping and may be stuck with poor transmit beamforming performance until the network access node eventually triggers transmit beamsweeping.

Recognizing these drawbacks, this disclosure is directed to a beamsweeping technique that uses payload data and receiver feedback to select a transmit antenna beam for a transmitter. For example, a terminal device may transmit to a network access node multiple blocks of payload data using different transmit antenna beams. The network access node may receive the payload data and respond with payload data feedback, such as retransmission information and transmit power adjustment requests. The terminal device can then assess the different transmit antenna beams based on the payload data feedback, such as by evaluating which transmit antenna beams had low retransmission rates or which had few transmit power increase requests. Using this information, the terminal device can then select one of the transmit antenna beams and use that transmit antenna beam to transmit to the network access.

Since the terminal device tests transmit antenna beams on payload data, the terminal device may not need dedicated radio resources for reference signals. This conserves radio resources and enables the terminal device to update its transmit beam without waiting for the network to allocate dedicated radio resources. Similarly, because the terminal device uses existing control resources for the feedback (e.g., ACKs/NACKs and transmit power control (TPC)), the network access node may not need to allocate extra resources to transmit separate beamsweeping feedback. Moreover, the terminal device can avoid the power penalty of performing a standalone transmit beamsweeping procedure.

Figure 2:
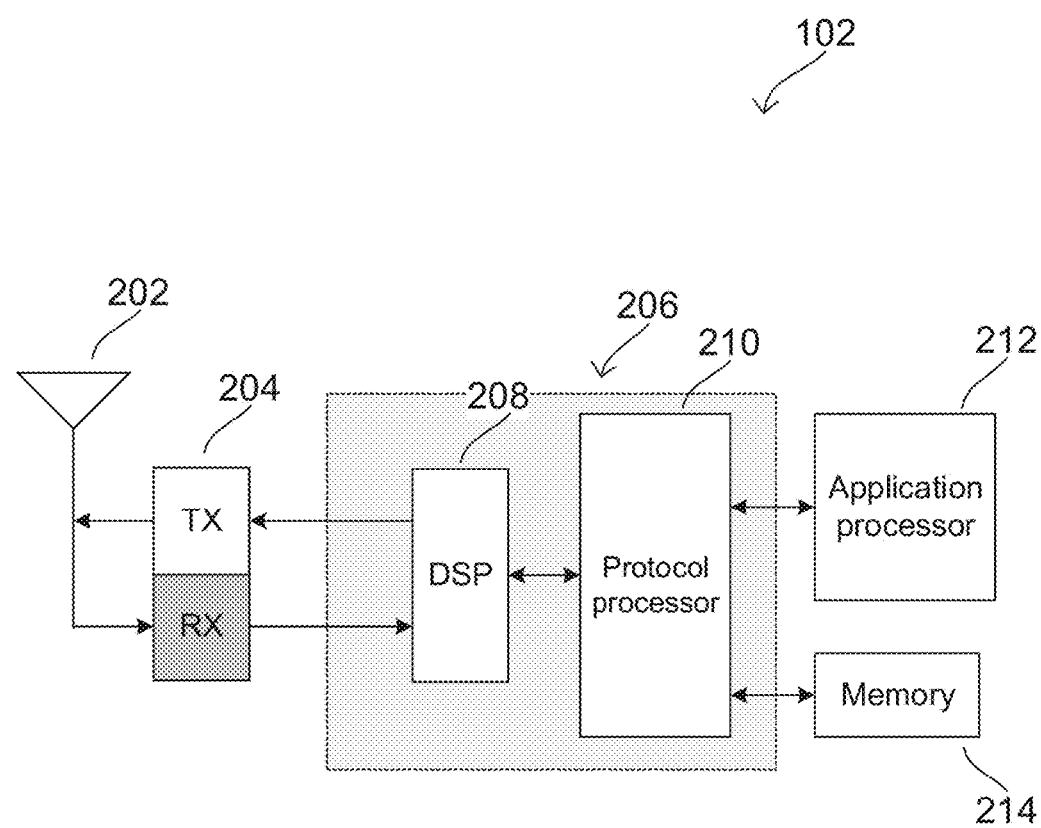
FIG. 2 shows an exemplary internal configuration of a terminal device according to some aspects.

This disclosure will first discuss general configurations for a network, terminal device, and beamforming, and will follow that with a description of beamsweeping techniques that use payload data. FIGS. 1 and 2 depict a general network and device architecture for wireless communications. FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, 5G NR, and the like, any of which may be applicable to radio communication network 100.

FIG. 2 shows an exemplary internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/ processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 112. If the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Continuing to FIG. 3, this figure illustrates exemplary beamforming systems according to some aspects. Many emerging communication technologies use such beamforming to improve communication performance. These techniques operate by adjusting the phase of antennas in an array to produce radiation patterns of constructive and destructive interference. By shaping and steering these radiation patterns, radio communication devices can achieve high beamforming gains, which can in turn improve radio communication reliability and performance. This can be particularly beneficial in radio communication technologies that operate at high frequencies, such as millimeter wave (mmWave) technologies. Because these radio technologies may operate at carrier frequencies of 30 GHz and above, beamforming gains can be extremely helpful in compensating for the high pathloss often experienced at carrier frequencies in these ranges.

Figure 3A:
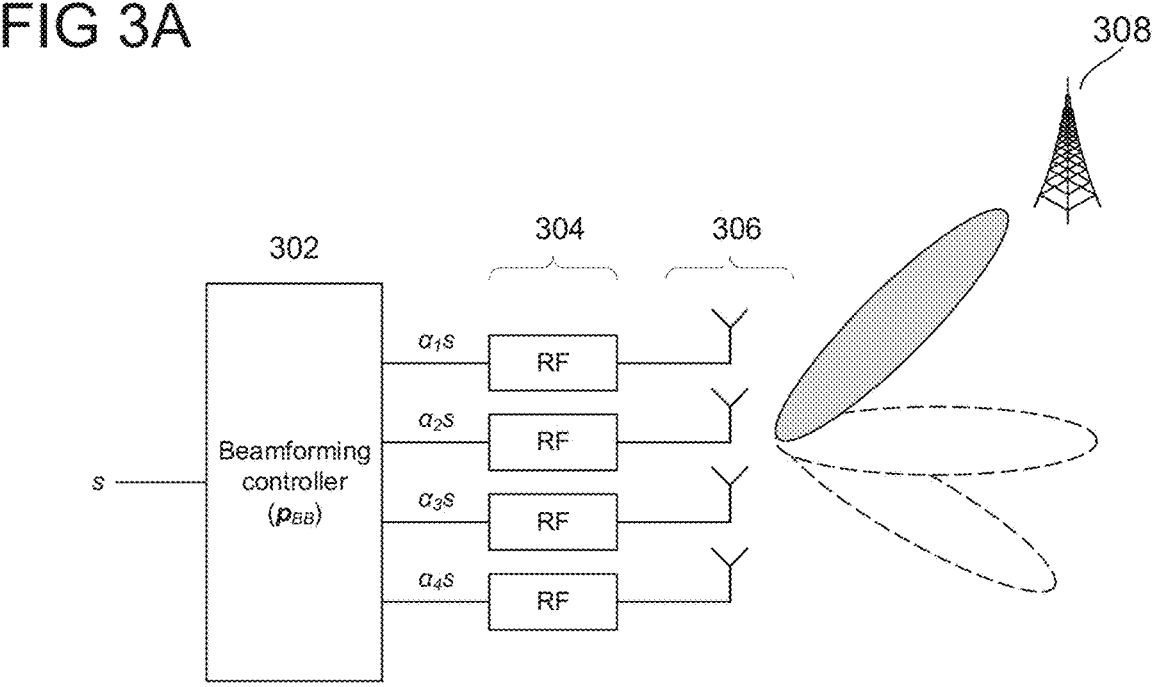
FIGS. 3A and 3B show exemplary configurations for digital and RF beamforming according to some aspects.
Figure 3B:
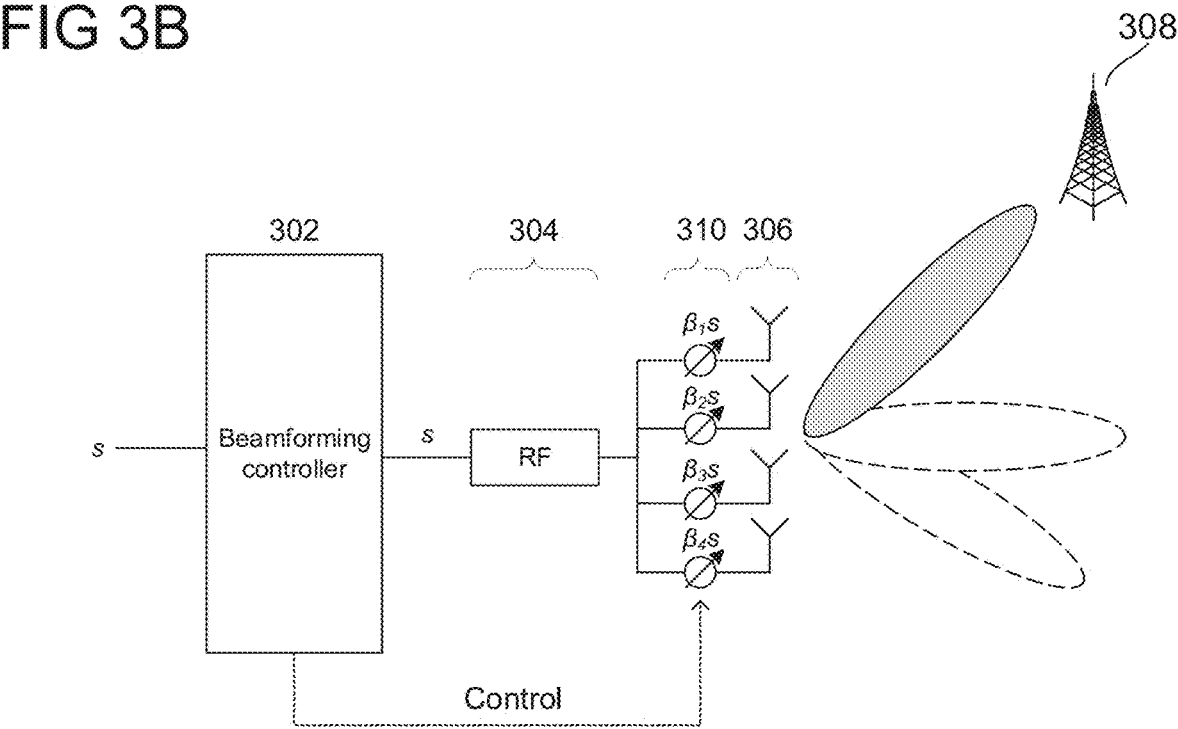

Beamforming systems may perform processing in one or both of the baseband and RF domains to shape antenna array beam patterns. FIGS. 3A and 3B show two simplified beamforming approaches as deployed for an exemplary four-element antenna array. Although the following description may focus on a beamforming in the transmit direction, the same beamforming techniques can be used to achieve beamforming gains in the receive direction. This includes adjusting the beamforming weights to form a receive antenna beam, receiving signals at each antenna element, applying the beamforming weights to the received signals, and combined the weighted signals to obtain a beamformed signal that is steered according to the receive antenna beam.

FIG. 3A illustrates a simplified digital baseband beamforming architecture that digitally applies complex beamforming weights (composed of both a gain and phase factor) in the baseband domain. As shown in FIG. 3A, beamforming controller 302 may receive baseband symbol s and subsequently apply a complex weight vector $p_{BB}=[\alpha_1\ \alpha_2\ \alpha_3\ \alpha_4]^T$ to s to generate $p_{BB}s$, where each element $\alpha_i$, i=1, 2, 3, 4 is a complex weight (comprising a gain factor and phase shift). Each resulting element $[\alpha_1 s\ \alpha_2 s\ \alpha_3 s\ \alpha_4 s]^T$ of $p_{BB}s$ may be baseband symbol s multiplied by some complex weight $\alpha_i$. Beamforming controller 302 may then map each element of $p_{BB}s$ to a respective RF chain of RF system 304, which may each perform digital to analog conversion (DAC), radio carrier modulation, and amplification on the received weighted symbols before providing the resulting RF symbols to a respective element of antenna array 306. Antenna array 306 may then wirelessly transmit each RF symbol. This exemplary model can also be extended to a multi-layer case where a baseband symbol vector s containing multiple baseband symbols $s_1$, $s_2$, etc., in which case baseband precoding vector $p_{BB}$ may be expanded to a baseband precoding matrix $p_{BB}$ for application to baseband symbol vector s. In this case, $\alpha_i$, i=1, 2, 3, 4 are row vectors, and $p_{BB}s=[\alpha_1 s\ \alpha_2 s\ \alpha_3 s\ \alpha_4 s]^T$. Thus, after multiplying $p_{BB}$ and s, the overall dimension is the same as the overall dimension at the output of beamforming controller 302. The below descriptions thus refer to beamforming controller 302 as $p_{BB}$ and transmit symbol/vector as s for this reason while this model can be extended to further dimensions as explained.

By manipulating the beamforming weights of $p_{BB}$, beamforming controller 302 may be able to utilize each of the four antenna elements of antenna array 306 to produce a steered beam (antenna beamforming pattern) that has greater beam gain than a single antenna element. The radio signals emitted by each element of antenna array 306 may combine to realize a combined waveform that exhibits a pattern of constructive and destructive interference that varies over distances and direction from antenna array 306. Depending on a number of factors (such as antenna array spacing and alignment, radiation patterns, carrier frequency, and the like), the various points of constructive and destructive interference of the combined waveform can create a focused beam lobe that can be "steered" in direction via adjustment of the phase and gain factors $\alpha_i$ of $p_{BB}$. FIG. 3A shows several exemplary steered beams generated by antenna array 306, which beamforming controller 302 may control by adjusting $p_{BB}$. Although only steerable main lobes are depicted in the simplified illustration of FIG. 3A, beamforming controller 302 may be able to comprehensively "form" the overall beam pattern including nulls and sidelobes through similar adjustment of $p_{BB}$.

Beamforming controller 302 may also perform adaptive beamforming, where beamforming controller 302 dynamically changes the beamforming weights in order to adjust the direction and strength of the main lobe in addition to nulls and sidelobes. With these adaptive approaches, beamforming controller 302 can steer the beam in different directions over time, which may be useful to track the location of a moving target point (e.g. a moving receiver or transmitter). In a radio communication context, beamforming controller 302 may identify the location of a target receiver device 308 (e.g. the direction or angle of target receiver device 308 relative to antenna array 306) and subsequently adjust $p_{BB}$ in order to generate a beam pattern with a main lobe pointing towards target receiver device 308, thus improving the array gain at target receiver device 308 and consequently improving the receiver performance. Through adaptive beamforming, beamforming controller 302 may be able to dynamically adjust or "steer" the beam pattern as target receiver device 308 moves in order to continuously provide focused transmissions to target receiver device 308 (or conversely focused reception).

In some aspects, beamforming controller 302 may be implemented as a microprocessor. Beamforming controller 302 therefore may be able to exercise a high degree of control over both gain and phase adjustments of $p_{BB}$ with digital processing. However, as shown in FIG. 3A for RF system 304 and antenna array 306, digital beamforming configurations may use a dedicated RF chain for each element of antenna array 306 (where each RF chain performs radio processing on a separate weighted symbol $\alpha_i s$ provided by beamforming controller 302); i.e. $N_{RF}=N$ where $N_{RF}$ is the number of RF chains and N is the number of antenna elements. Because there may be a complex assortment of circuitry in each RF chain (DAC, amplification, mixing, etc.), these digital beamforming approaches can be expensive and power-inefficient. These issues may be worsened as the involved number of antennas increases, which may be particularly problematic for the massive antenna arrays targeted for next-generation technologies that will include tens or even hundreds of antenna elements.

Contrasting with the beamforming controller architecture of FIG. 3A, FIG. 3B shows an RF beamforming approach. As shown in FIG. 3B, beamforming controller 302 may provide baseband symbol s to RF transceiver 304. RF transceiver 304 may perform RF transmit processing on baseband symbol s and provide the resulting symbol s (e.g., an analog version of s) to each of phase shifters 310. For instance, there may be an analog power splitter after RF transceiver 304 that splits the analog version of s into four signals, and then provides the four signals to phase shifters 310. In the receive direction, the analog power is replaced with an adder that combines the four signals from phase shifters 310. In the example shown in FIG. 3B, phase shifters 310 may include four phase shifters 310 that each apply a respective phase shift $\beta_1$ to $\beta_4$ to s. In some aspects, phase shifters 310 may be analog RF phase shifters that apply their respective phase shifts in the analog RF domain. Phase shifters 310 may provide the resulting phase-shifted symbols $\beta_1 s$ to $\beta_4 s$ to antenna array 306. The respective antennas of antenna array 306 may wirelessly transmit the phase-shifted symbols. Similar to the operation of FIG. 3A's digital beamformer, FIG. 3B's RF beamformer may realize a specific antenna beamforming pattern by selecting the phase weights $\beta_1$ to $\beta_4$. Accordingly, beamforming controller 302 may be configured to select phase weights $\beta_1$ to $\beta_4$, such as based on the direction of target receiver device 308, and provide the phase weights to $\beta_1$ to $\beta_4$ to phase shifters 310 (with the "Control" line shown in FIG. 3B). Beamforming controller 302 may therefore steer the main antenna beam towards target receiver device 308 through proper selection of the phase weights $\beta_1$ to $\beta_4$. In some cases, the phase weights may be phase-only (e.g., only a phase shift with no amplitude change); in other aspects, the phase weights may have a phase and a gain component (e.g., a phase shift and an amplitude gain).

Figure 4:
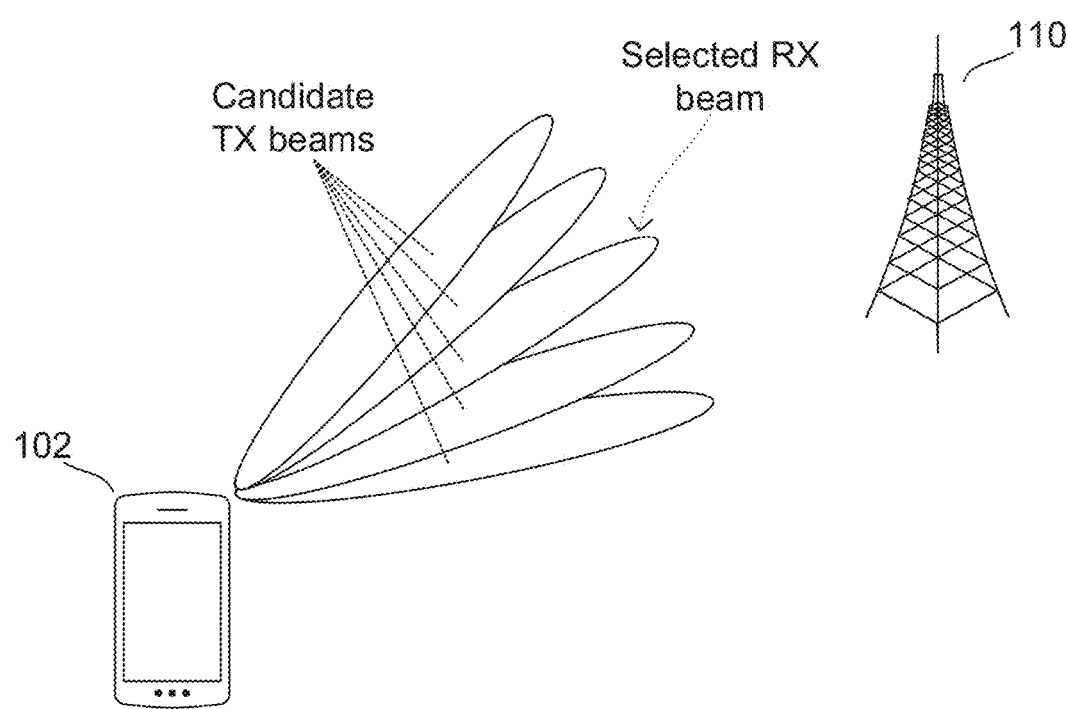
FIG. 4 shows an exemplary illustration of transmit beamsweeping according to some aspects.

As introduced above, transmitters like terminal devices may use this disclosure's beamsweeping techniques to beamsweep using payload data. FIG. 4 shows an example according to some aspects. As FIG. 4 shows, terminal device 102 may transmit and receive signals with network access node 110. Terminal device 102 may use transmit and receive beamforming to increase the radio link strength with network access node 110. Looking first at receive beamforming, terminal device 102 may perform a receive beamsweeping procedure to select a receive antenna beam to use for receiving signals from network access node 110. For instance, network access node 110 may schedule certain radio resources as downlink beamsweeping reference signals (e.g., demodulation reference signals (DMRS) or channel state information reference signals (CSI-RS)). During each of those scheduled radio resources, network access node 110 may transmit a reference signal burst to terminal device 102. Terminal device 102 may adjust its antenna array 202 to receive the reference signal bursts with different receive antenna beams. Terminal device 102 may perform a radio measurement (e.g., with a measurement engine in digital signal processor 208) on the reference signal bursts to obtain a radio measurement for each the receive antenna beams. Using those radio measurements, terminal device 102 may identify the receive antenna beam that yields the best radio link (e.g., strongest radio link) and may then use that receive antenna beam to receive signals from network access node 110. Terminal device 102 may update the receive antenna beam over time, such as with a fixed period or when terminal device 102 changes its positioning.

As discussed above, some schemes for transmit beamforming may use a dedicated transmit beamsweeping procedure. In those procedures, network access node 110 may allocate dedicated radio resources during which terminal device 102 transmits its own reference signal bursts (e.g., sounding reference signals (SRS) for 5G NR). Like the receive beamsweeping case, terminal device 102 may transmit the reference signal bursts with different transmit antenna beams. That is, terminal device 102 may adjust antenna array 202 to use different transmit antenna beams during the reference signal bursts. Network access node 110 may receive and measure the reference signal bursts to obtain a radio measurement for each. Network access node 110 may then send dedicated beamsweeping feedback (e.g., with additional radio resources) to terminal device 102 that indicates which reference signal burst produced the best radio measurement (e.g., highest signal strength). Terminal device 102 may identify the transmit antenna beam that maps to the indicated reference signal burst and may then use that transmit antenna beam to transmit to network access node 110.

As previously discussed, however, these dedicated transmit beamsweeping procedures may require extra radio resources, drain battery, and prevent the terminal device from quickly selecting new transmit antenna beams. Thus, terminal device 102 may use a specialized transmit beamsweeping procedure to select the transmit antenna beam. In one example, terminal device 102 may first select a new receive antenna beam, such as with the receive antenna beamsweeping procedure described above. Since terminal device 102 is using a new receive antenna beam, it is likely that terminal device 102 should also update its transmit antenna beam. Accordingly, terminal device 102 may identify a plurality of candidate transmit antenna beams to evaluate for the new transmit antenna beam. In some cases, terminal device 102 may use the new receive antenna beam as a starting point, such as by selecting, as the candidate transmit antenna beams, transmit beams that point in similar directions to the new receive antenna beam.

Terminal device 102 may then evaluate the plurality of candidate transmit antenna beams by transmitting payload data with each. Thus, instead of evaluating transmit antenna beams by transmitting reference signals, terminal device 102 may transmit actual payload data. As used herein, payload data refers to user-plane or control-plane data that carries information bits. Payload data differentiates from reference signals (including synchronization signals), which do not carry a message but instead only represent a predefined signal sequence. As non-limiting examples, payload data can include physical uplink shared channel (PUSCH) data or physical uplink control channel (PUCCH) data. To test the plurality of candidate transmit antenna beams, terminal device 102 may transmit multiple blocks of payload data for each candidate transmit antenna beam. When it transmits the blocks of payload data, terminal device 102 may use the radio resources that network access node 110 allocates for payload data; thus, this technique may not use additional radio resources that are dedicated to beamsweeping procedures.

Network access node 110 may then receive the payload data. The beamsweeping by terminal device 102 may be transparent to network access node 102. In other words, network access node 110 may not be aware that terminal device 102 is testing different candidate transmit antenna beams with the payload data. Since the payload data was scheduled on normal radio resources, to network access node 110 it may appear that terminal device 102 is transmitting payload data in a normal fashion. Thus, network access node 110 may receive and process the payload data as it normally handles payload data. This can include, for example, decoding and demodulating the payload data and perform layer-specific processing on the payload according to the various layers of the communication protocol.

Network access node 110 may then provide retransmission and/or power control feedback to terminal device 102. For retransmission feedback, network access node 110 may check whether it can successfully decode each block of payload data, such as with a cyclic redundancy check (CRC) or other type of check that evaluates decoding success. If network access node 110 cannot successfully decode a block of payload data, network access node 110 transmits a retransmission request to terminal device 102. This retransmission request asks terminal device 102 to retransmit the block of payload data, and may be a non-acknowledgement (NACK) message. On the other hand, if network access node 110 successfully decodes a block of payload data, network access node 110 may not transmit a NACK. Depending on the standard, network access node 110 may send to terminal device 110 a positive acknowledgement (ACK) that affirms successful receipt of the block of payload data.

For power control feedback, network access node 110 may evaluate signals it receives from terminal device 102 and may determine whether terminal device 102 should increase or decrease its transmit power. For instance, if network access node 110 receives signals from terminal device 102 with very low receive power (e.g., a received signal power that is lower than a decoding sensitivity requirement), network access node 110 may send a transmit power adjustment (e.g., transmit power control (TPC) command, carried by the physical downlink control channel (PDCCH) in LTE and 5G NR) that instructs terminal device 102 to increase its uplink transmit power. Conversely, if network access node 110 receives signal from terminal device 102 excessive receive power, network access node 110 may send a transmit power adjustment that instructs terminal device to decrease its uplink transmit power.

Network access node 110 may be configured to send retransmission and power control feedback whenever terminal device 102 sends payload data. Thus, network access node 110 may provide this feedback no matter whether terminal device 102 is beamsweeping or not. Unlike the feedback for dedicated transmit beamsweeping, this feedback does not use extra dedicated radio resources.

Terminal device 102 may then use network access node 102's retransmission and power control feedback to evaluate the plurality of candidate transmit antenna beams. For instance, terminal device 102 may determine the retransmission rate (e.g., ratio of NACKs to ACKs) for each candidate transmit antenna beam based on the retransmission feedback for the blocks of payload data for the respective candidate transmit antenna beam. Based on retransmission rate, the best candidate antenna beams are those with low retransmission rates (e.g., significantly more ACKs than NACKs). For power control feedback, terminal device 102 may determine whether any of the candidate transmit antenna beams caused network access node 110 to request transmit decreases. If so, terminal device 102 may consider those candidate transmit antenna beams poor choices for the transmit antenna beam.

Using FIG. 4 as an example, terminal device 102 may use the five shown transmit antenna beams as the plurality of candidate transmit antenna beams. Some may point more directly to network access node 110 than others. For instance, the outermost candidate transmit antenna beams may not point in the direction of network access node 110 while the inner candidate transmit antenna beams may point closer to network access node 110. As explained above, terminal device 102 may send multiple blocks of payload data with each of the plurality of candidate transmit antenna beams, and may evaluate the resulting feedback from network access node 110 to select one as the transmit antenna beam.

Because the outermost candidate transmit antenna beams do not point directly at network access node 110, these candidate transmit antenna beams are likely to produce the worst feedback from network access node 110. For instance, when terminal device 102 transmits blocks of payload data with one of the outermost candidate transmit antenna beams, antenna array 102 may propagate the wireless signals in a different direction than network access node 110. As a result, network access node 110 may receive the wireless signals (containing the blocks of payload data) with lower received signal power than the inner candidate transmit antenna beams. Because the received signal power is low, the wireless signal may be more susceptible to noise and interference, and network access node 110 may not be able to decode one or more of the blocks of payload data. Thus, network access node 110 may transmit a high rate of NACKs for the blocks of payload data for this outermost candidate transmit antenna beam. Based on that retransmission feedback, terminal device 102 may conclude that this outermost candidate transmit antenna beam has a high retransmission rate and is thus a poor choice for the transmit antenna beam.

The power control feedback may similarly indicate that this outermost candidate transmit antenna beam is a poor choice. Because it is not pointed directly toward network access node 110, network access node 110 may determine that the wireless signals (carrying the blocks of payload data for this outermost candidate transmit antenna beam) have low received signal power. To counteract the low received signal power, network access node 110 may send power control feedback that instructs terminal device 102 to increase its transmit power. Accordingly, terminal device 102 may determine that this outermost candidate transmit antenna beam is received with low signal power at network access node 110, meaning that it is a poor choice for the transmit antenna beam.

Figure 5:
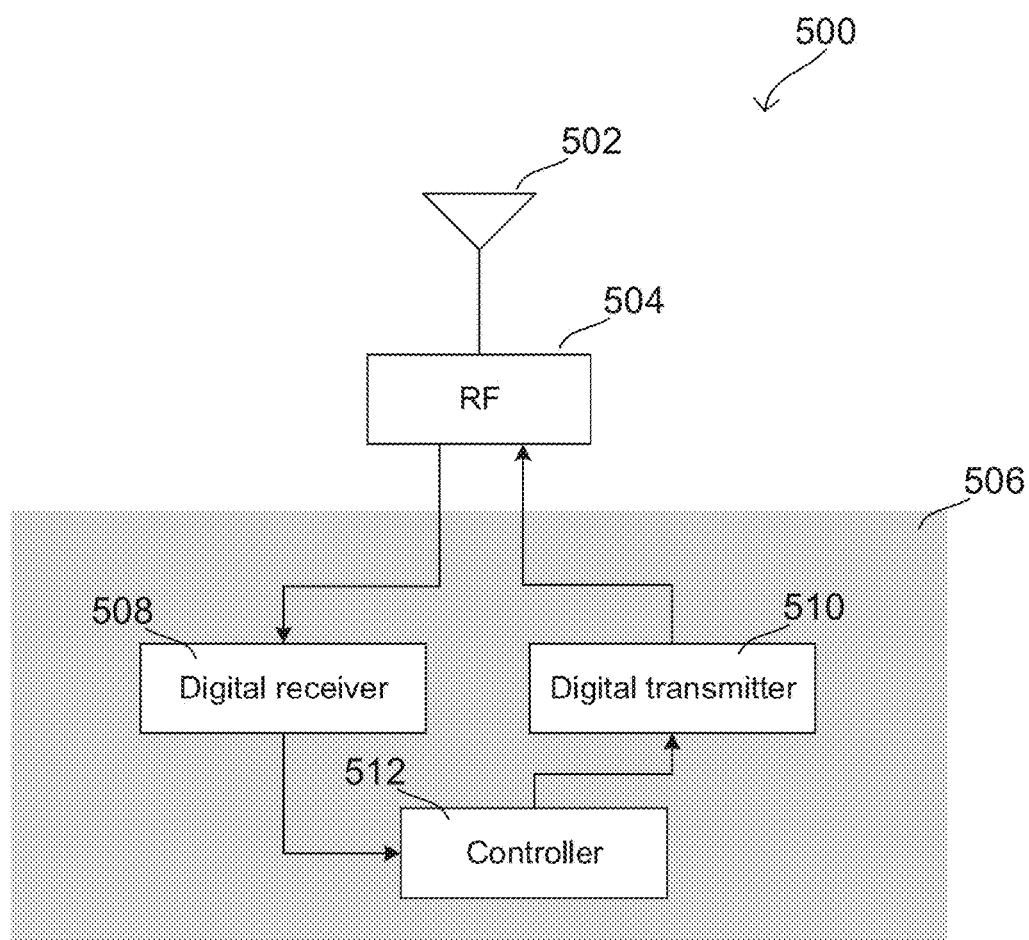
FIG. 5 shows an exemplary internal configuration of a wireless device for transmit beamsweeping according to some aspects.

FIG. 5 shows an exemplary internal configuration of terminal device 102 according to some aspects. While this depiction includes many of the same subcomponents of FIG. 2, FIG. 3's depiction is focused on terminal device 102's selection of roaming mobile networks. It therefore omits other subcomponents that are less directly related to those capabilities. As shown in FIG. 5, terminal device 102 may include antenna array 502, RF transceiver 504, and baseband modem 506, which may be configured in the manner described above for terminal device 102 in FIG. 2. Accordingly, baseband modem 506 may direct communication operations of terminal device 102 according to the communication protocols for each radio access network, and may control antenna array 502 and RF transceiver 504 to transmit and receive radio signals according to the formatting and scheduling parameters defined by each communication protocol.

As FIG. 5 shows, terminal device 102 may include antenna array 502, RF transceiver 504, and baseband processor 506. Terminal device 102 may transmit and receive radio signals on one or more radio access networks. Baseband processor 506 may direct that communication functionality of terminal device 102 according to the communication protocols for each radio access network, and may control antenna array 502 and RF transceiver 504 to transmit and receive radio signals according to the formatting and scheduling parameters defined by each communication protocol.

Terminal device 102 may transmit and receive wireless signals with antenna array 502, which may be an antenna array that includes multiple antenna elements. In some aspects, antenna array 502 may include analog antenna combination and/or beamforming circuitry (e.g., a set of phase shifters for phased-array beamforming). In the receive (RX) path, RF transceiver 504 may receive analog radio frequency signals from antenna array 502 and perform analog and digital RF front-end processing on the analog radio frequency signals to produce digital baseband samples (e.g., In-Phase/Quadrature (IQ) samples) to provide to baseband processor 506. RF transceiver 504 may include analog and digital reception components including amplifiers (e.g., Low Noise Amplifiers (LNAs)), filters, RF demodulators (e.g., RF IQ demodulators)), and analog-to-digital converters (ADCs), which RF transceiver 504 may utilize to convert the received radio frequency signals to digital baseband samples. In the transmit (TX) path, RF transceiver 504 may receive digital baseband samples from baseband processor 506 and perform analog and digital RF front-end processing on the digital baseband samples to produce analog radio frequency signals to provide to antenna array 502 for wireless transmission. RF transceiver 504 may thus include analog and digital transmission components including amplifiers (e.g., Power Amplifiers (PAs), filters, RF modulators (e.g., RF IQ modulators), and digital-to-analog converters (DACs), which RF transceiver 504 may utilize to mix the digital baseband samples received from baseband processor 506 and produce the analog radio frequency signals for wireless transmission by antenna array 502. In some aspects baseband processor 506 may control the radio transmission and reception of RF transceiver 504, including specifying the transmit and receive radio frequencies for operation of RF transceiver 504.

FIG. 5 also depicts several internal components of baseband processor 506, including digital receiver 508, digital transmitter 510, and controller 512. In some aspects, baseband processor 506 may include a digital signal processor and a protocol controller (e.g., such as in FIG. 2). Digital receiver 508, digital transmitter 510, and controller 512 may therefore be subcomponents of the digital signal processor (e.g., physical layer components) and/or subcomponents of the protocol controller (e.g., protocol stack components). In some aspects, digital receiver 508 may be the physical layer receive chain, digital transmitter 510 may be the physical layer transmit chain, and controller 512 may be the protocol controller that executes the protocol stack of baseband processor 506. For example, digital receiver 508 may include a demodulator, demapper (e.g., constellation demapper), de-interleaver, decoder, and/or descrambler. Digital receiver 508 may receive wireless signals in the form of baseband samples via antenna array 502 and RF transceiver 504. Digital receiver 508 may then sequentially process these baseband samples with the demodulator, demapper (e.g., constellation demapper), de-interleaver, decoder, and/or descrambler to produce a bitstream, which digital receiver 508 may provide to controller 512 (e.g., to protocol stack layers of controller 512). Digital transmitter 510 may include a scrambler, encoder, interleaver, mapper (e.g., constellation mapper), and/or a modulator, which may sequentially process a bitstream (e.g., provided by protocol stack layers of controller 512) to produce baseband samples (e.g., complex IQ symbols). Digital transmitter 510 may then transmit these baseband samples as wireless signals via RF transceiver 504 and antenna array 502. Controller 512 may include one or more processors configured to execute the protocol stack layers as software. This may include generating messages for digital transmitter 510 to transmit (e.g., messages including user or control data) and/or recovering messages from bitstreams provided by digital receiver 508. In some aspects, controller 512 may be configured to perform user-plane and control-plane functions to facilitate the transfer of application layer data to and from terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 512 may include executable instructions that define the logic of these functions.

Controller 512 may also be configured to control beamforming by antenna array 502. In some aspects, controller 512 may be configured with the features of beamforming controller 302 in FIGS. 3A and 3B and may control the digital or RF beamforming of antenna array 502. Controller 512 may therefore select the beamforming weight vector for antenna array 502 (either to apply digitally as in FIG. 3A or with RF phase shifters as in FIG. 3B).

In some aspects, terminal device 102 may be configured to perform this disclosure's beamsweeping technique by executing exemplary flow chart 600 shown in FIG. 6. As shown in FIG. 6, terminal device 102 may first detect an antenna position change in stage 602. For instance, controller 512 may initially control the beamforming circuitry in antenna array 502 to receive with a first receive antenna pattern. That is, controller 512 may have previously identified a set of beamforming weights that produce the first receive antenna pattern, and may control phase shifters in antenna array 502 to shift received signals with the set of beamforming weights. However, controller 512 may eventually detect that this first receive antenna pattern is outdated in stage 602. This can happen, for example, when a user moves or rotates terminal device 102 so the first receive antenna pattern is not spatially oriented toward network access node 110. In some aspects, controller 512 may detect this change based on downlink beam measurements (e.g., where digital receiver 508 performs a radio measurement on reference signals from network access node 110 and controller 512 determines the radio measurement is less than a predefined threshold), or based on a sensor (e.g., where terminal device 102 includes one or more sensors that detect motion). In any case, controller 512 may detect the change and determine that terminal device 102 should update its receive antenna beam.

After detecting the change, controller 512 may update the receive antenna beam in stage 604. For example, controller 512 may perform receive beamsweeping to select an updated receive antenna pattern that is oriented toward network access node 110. As explained above, for receive beamsweeping network access node 110 may periodically transmit reference signals (e.g., BM SRS or CSI-RS for 5G NR). Controller 512 may know in advance which radio resources carry these reference signals. Controller 512 may control antenna array 502's beamforming circuitry to receive the reference signals with each of a plurality of candidate receive antenna beams. Digital receiver 508 may receive the weighted signals via antenna array 502 and RF transceiver 504, and may perform radio measurements to obtain radio measurements for each of the plurality of candidate receive antenna beams. Depending on how suitable each candidate receive antenna beam is, certain radio measurements will be higher than others (e.g., higher signal strength). Digital receiver 508 may provide these radio measurements to controller 512. Controller 512 may then select an updated receive antenna beam (e.g., different from the first receive antenna beam) from the plurality of candidate receive antenna beams based on the radio measurements. In one example, controller 512 may identify the radio measurement with the highest value (e.g., the highest signal strength), identify the candidate receive antenna pattern that produced that radio measurement (e.g., the receive antenna pattern to which antenna array 502's beamforming circuitry was set when the radio measurement was produced), and select that candidate receive antenna pattern as the updated receive antenna beam.

Thus, with stage 604 controller 512 may update the receive antenna beam. In many scenarios, updating the receive antenna beam indicates that the transmit antenna beam should also be updated. For instance, if a user moves or rotates terminal device 102 so its receive antenna beam is suboptimal, it is likely that the transmit antenna beam is also now suboptimal. Controller 512 may therefore also attempt to update its transmit antenna beam (e.g., the transmit antenna beam to which controller 512 has currently set antenna array 502's beamforming circuitry).

After updating the receive antenna beam, controller 512 may select a plurality of candidate transmit antenna beams based on the updated receive antenna beam in stage 606. For example, as explained for FIG. 4, the updated receive antenna beam may be a useful starting point when trying to update the transmit antenna beam. That is, although the optimal transmit antenna beam may not always perfectly overlap with the optimal receive antenna beam, the optimal transmit and receive antenna beams are likely to be close together. As such, controller 512 may use the updated receive antenna beam to select the plurality of candidate transmit antenna beams.

For instance, in some aspects controller 512 may have a predefined set of transmit antenna beams, each mapped to a different angular direction and defined by a respective set of beamforming weights. The collection of sets of beamforming weights can form a beamforming codebook, with each set of beamforming weights acting as the codeword for its corresponding transmit antenna beam. After controller 512 selects the updated receive beam, it may therefore identify the angular direction to which the updated receive beam maps (e.g., the angular direction in which the updated receive beam's main lobe points). Controller 512 may then identify a plurality of transmit antenna beams that map to similar angular directions, such as by identifying a predefined number of transmit antenna beams that map to the closest angular directions to the updated receive antenna beam. Controller 512 may select these as the plurality of candidate transmit antenna beams in stage 606.

Using FIG. 4 as an example of this, controller 512 may identify the innermost antenna beam as the updated receive antenna beam, which maps to a particular angular direction. Controller 512 may then identify, for example, five transmit antenna beams that map to the closest angular directions to the updated receive antenna beam. Of the plurality of predefined transmit antenna beams, one may map to the same angular direction as the updated receive antenna beam, two more may map to the closest angular directions to the updated receive antenna beam, and the outermost transmit antenna beams may map to the second-closest angular directions to the updated receive beam. As these five predefined transmit antenna beams map to the closest angular directions to the updated receive antenna beam, controller 512 may select them as the plurality of candidate transmit antenna beams in stage 606.

In some aspects, controller 512 may identify the plurality of candidate transmit antenna beams based on a predefined table that maps receive antenna beams to candidate transmit antenna beams. For instance, the predefined table may be developed offline, and may map receive antenna beam to candidate transmit antenna beams based on which candidate transmit antenna beams correspond spatially to different receive antenna beams. As explained previously, the spatial correspondence between receive and transmit antenna beams may depend on factors like receive and transmit phase shifter circuitry and other device design parameters. In some aspects, the predefined table may be developed based on lab RF measurements or factory RF calibrations, which may take those factors into account.

Continuing with flow chart 600, controller 512 may then evaluate the plurality of candidate transmit antenna beams with transmit beamsweeping. In some aspects, controller 512 may first determine whether dedicated transmit beamsweeping is possible; in other aspects, controller 512 may not consider dedicated transmit beamsweeping and may instead perform transmit beamsweeping with payload data. In flow chart 600's example, controller 512 may first consider dedicated transmit beamsweeping. Thus, controller 512 may determine whether beamsweeping reference signal bursts are available in stage 608. For example, as previously explained, network access node 110 may be responsible for triggering dedicated transmit beamsweeping (where it allocates reference signal resources for terminal device 102 to transmit), and terminal device 102 may have little or no control over its timing. However, it is still possible that network access node 110 has already, or will soon, trigger dedicated beamsweeping. Controller 512 may therefore check in stage 608 whether network access node 110 has scheduled transmit beamsweeping reference signal bursts for terminal device 102 (e.g., whether it has received from network access node 110 a grant to transmit beamsweeping reference signals), or whether network access node 110 is expected to soon schedule transmit beamsweeping reference signal bursts for terminal device 102 (e.g., if network access node 110 periodically triggers dedicated transmit beamsweeping and the next instance is in the near future). Controller 512 may have access to scheduling information for terminal device 102, and may therefore check the scheduling information in stage 608 to determine whether dedicated transmit beamsweeping has been or soon will be scheduled.

If controller 512 determines that beamsweeping reference signal bursts are available in stage 608, controller 512 may perform dedicated transmit beamsweeping in stage 610. As explained above, network access node 110 may allocate transmit reference signal bursts to terminal device 102, such as by scheduling radio resources during which terminal device 102 transmits reference signal bursts. Controller 512 may then transmit the reference signal bursts with different transmit antenna beams from the plurality of candidate transmit antenna beams (e.g., one or more reference signal bursts for each of the plurality of candidate transmit antenna beams). For instance, controller 512 may instruct digital transmitter 510 to transmit the reference signal bursts during the scheduled times, and digital transmitter 510 may generate and transmit the reference signal bursts vis RF transceiver 504 and antenna array 502. Network access node 110 may receive and measure the reference signal bursts and may identify which reference signal bursts produced the best measurement (e.g., highest signal strength). Network access node 110 may then send dedicated beamsweeping feedback to terminal device 102 that identifies the best reference signal burst. Digital receiver 508 may receive the dedicated beamsweeping feedback (via antenna array 502 and RF transceiver 504) and may provide it to controller 512. Controller 512 may identify which candidate transmit antenna beam maps to the best reference signal burst reported in the feedback and then select that candidate transmit antenna beam as the transmit antenna beam. Controller 512 may then control antenna array 502's beamforming circuitry to set to the beamforming weights for that transmit antenna beam, and terminal device 102 may transmit signals to network access node 110 with the transmit antenna beam.

Conversely, if controller 512 determines in stage 608 that transmit beamsweeping reference signal bursts are not available, controller 512 may perform transmit beamsweeping with payload data. As noted above, in some aspects, controller 512 may skip stage 608, and may perform transmit beamsweeping with payload data without considering dedicated transmit beamsweeping. In either case, controller 512 may proceed to stage 612. In that stage, controller 512 may transmit blocks of payload data using the plurality of candidate transmit antenna beams. As previously explained, this payload data is different from reference signal bursts. While reference signals bursts only carry predefined signal sequences, payload data includes information bits, such as user-plane or control-plane data. Thus, instead of beamsweeping reference signal bursts, terminal device 102 may beamsweep with payload data.

In some aspects, controller 512 may identify an overall pool of blocks of payload data that terminal device 102 is scheduled to transmit. Controller 512 may then assign multiple blocks from the overall pool to different candidate transmit antenna beams, e.g., so each of the plurality of candidate transmit antenna beams is mapped to a different set of blocks of payload data. To sweep the candidate transmit antenna beams, controller 512 may then transmit each set of multiple blocks with the respectively mapped candidate transmit antenna beams. That is, when a given block of payload data is scheduled for transmission, controller 512 may control antenna array 502's beamforming circuitry to set to the beamforming weights for the mapped candidate transmit antenna beam. Digital transmitter 510 may then transmit the block of payload data via RF transceiver 504 and antenna array 502.

Figure 7A:
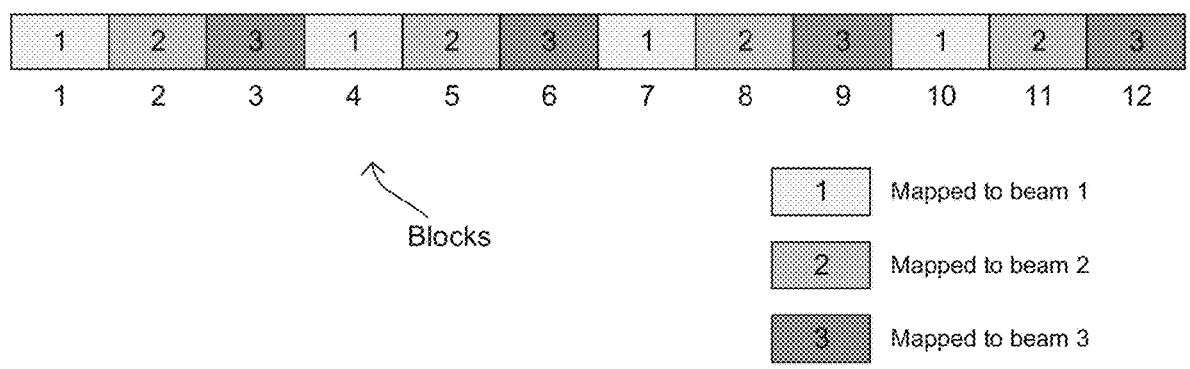
FIGS. 7A and 7B show examples of assigning blocks of payload data to different candidate transmit antenna beams according to some aspects.
Figure 7B:
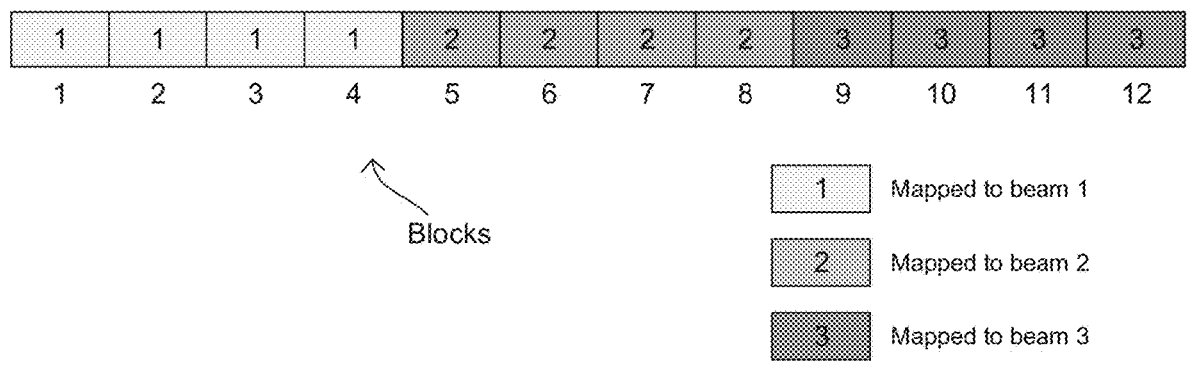

FIGS. 7A and 7B shows examples of how controller 512 can allocate an overall pool of blocks of payload data to the plurality of candidate transmit antenna beams according to some aspects. In these simplified examples, controller 512 may allocate an overall pool of 12 blocks between three candidate transmit antenna beams (beams 1-3). For instance, in FIG. 7A controller 512 may alternate, or interleave, the overall pool of blocks of payload data between the candidate transmit antenna beams. This produces a round-robin pattern, where the blocks are allocated to beam 1, beam 2, beam 3, beam 1, beam 2, beam 3, beam 1, and so on. This pattern is exemplary, and countless other patterns can be used. In the depicted example, controller 512 allocates each block of the overall pool to a candidate transmit antenna beams. In other example, controller 512 may "skip" allocating some blocks to candidate transmit antenna beams, such as where controller 512 allocates every other block to a candidate transmit antenna beam, or any similar pattern. FIG. 7B shows another example where controller 512 may allocate contiguous sets of blocks to each candidate transmit antenna beams. As shown, controller 512 may allocate blocks 1-4 to beam 1, blocks 5-8 to beam 2, and blocks 9-12 to beam 3.

Once controller 512 assigns blocks of payload data to candidate transmit antenna beams, controller 512 may transmit the blocks of payload data to network access node 110 in stage 612. For instance, controller 512 may provide the blocks of payload data to digital transmitter 510, which may then transmit the blocks of payload data in their assigned radio resources. Controller 512 may then control antenna array 502's beamforming circuitry to set to the candidate transmit antenna beam assigned to each block of payload data.

With this procedure, terminal device 102 may beamsweep with payload data. Network access node 110 may receive the wireless signals that carry the blocks of payload data (e.g., on the scheduled radio resources) and then process the wireless signals to recover and decode the blocks of payload data. Depending on the communication standard, network access node 110 may generate feedback on the payload data and transmit the feedback to terminal device 102. As introduced above, this feedback can be retransmission feedback and/or power control feedback. These types of feedback are payload feedback and differ from beamsweeping feedback (e.g., beamsweeping feedback that identifies a reference signal burst as being best for beamsweeping).

In stage 614, terminal device 102 may observe the retransmission or power control feedback from network access node 110. Terminal device 102 may then select a transmit antenna beam based on the feedback in stage 616. For cases where terminal device 102 uses retransmission feedback, network access node 110 may be configured to attempt to decode the blocks of payload data and determine whether the decoding is successful. For example, digital transmitter 510 may generate an error check field for each block of payload data, such as a cyclic redundancy check (CRC) or other type of error check. Digital transmitter 510 may include this error check field in each block of payload data. When network access node 110 receives the block of payload data and attempts to decode it, network access node 110 may attempt to re-generate the error check field based on the decoded data. If the regenerated error check field matches the error check field in the block of payload data, network access node 110 may conclude the decode was successful. If the regenerated error check field does not match the error check field in the block of payload data, network access node 110 may conclude the decode was not successful. In that case, network access node 110 may send to terminal device a retransmission request that request retransmission of that block of payload data. This retransmission request may be a NACK. In some cases, network access node 110 may also send an ACK when the decode is successful; in other cases, terminal device 102 may assume the decode was successful if it does not receive any retransmission feedback.

Digital transmitter 510 may receive this retransmission feedback (via antenna array 502 and RF transceiver 504) and provide it to controller 512. Controller 512 may collect the retransmission feedback for the blocks of payload data for which it beamswept (e.g., those of the overall pool that it assigned to candidate transmit antenna beams). Controller 512 may then select a transmit antenna beam based on the transmission feedback in stage 616. In one example, controller 512 may determine, based on the retransmission feedback, a retransmission rate for each of the plurality of candidate transmit antenna beams. This retransmission rate for a candidate transmit antenna beam can be any metric that indicates the number of successful and unsuccessful transmissions of blocks of payload data for that candidate transmit antenna beam. For instance, controller 512 may determine, for each candidate transmit antenna beam, the number of blocks of payload data (transmitted with the candidate transmit antenna beam) that were successfully transmitted (e.g., that prompted an ACK or no response) and the number of blocks of payload data that were not successfully transmitted (e.g., that prompted a NACK). Controller 512 may then determine the retransmission rate as the ratio of unsuccessful to total transmissions (or, alternatively, as the ratio of unsuccessful to successful transmissions). This retransmission rate can be expressed, in some examples, as a percentage, such as a 10% retransmission rate that indicates one unsuccessfully transmitted block of payload data out of every 10 total transmitted blocks of payload data.

In some aspects, controller 512 may determine such a retransmission rate for each of the plurality of candidate transmit antenna beams. This can be part of stage 614. Controller 512 may then select one of the candidate transmit antenna beams based on the retransmission rates in stage 616. For instance, controller 512 may identify which candidate transmit antenna beam has the lowest retransmission rate (e.g., most successful transmissions to unsuccessful transmissions), and then select that candidate transmit antenna beam to use as a transmit antenna beam. After selecting the transmit antenna beam, controller 512 may control antenna array 502's beamforming circuitry to set the beamforming weights to the transmit antenna beam. Digital transmitter 510 may then transmit signals to network access node 100 (e.g., that carry additional payload data) via RF transceiver 504 and antenna array 502. Because antenna array 502 is set to the transmit antenna beam, terminal device 102 may transmit signals to network access node 110 with the transmit antenna beam.

When using retransmission rate to select the transmit antenna beam, controller 512 may therefore determine feedback statistics for each of the plurality of candidate transmit antenna beams. Controller 512 may then select a transmit antenna beam based on the feedback statistics. As described above, in some aspects controller 512 may transmit multiple blocks of payload data for each candidate transmit antenna beam, and then receive multiple feedback messages (e.g., NACKs and, optionally, ACKs) for each candidate transmit antenna beam. Controller 512 may then use the feedback messages for a given candidate transmit antenna beam to determine feedback statistics (e.g., retransmission rate) for that candidate transmit antenna beam. In some cases, controller 512 may obtain more accurate feedback statistics by transmitting more blocks of payload data for each candidate transmit antenna beam. There may be, however, a tradeoff between feedback statistic accuracy and latency, since transmitting a higher number of blocks of payload data for each candidate transmit antenna beam may take a longer amount of time.

That description covered cases where terminal device 102 uses retransmission feedback to select the transmit antenna beam. Additionally or alternatively, terminal device 102 may observe power control feedback in stage 614 and then select the transmit antenna beam in stage 616 based on the power control feedback. For instance, network access node 110 may be configured to send power control feedback to terminal device 102 that instructs it to increase or decrease its uplink transmit power. To take one example, if network access node 110 determines that it receives terminal device 102's transmissions with very low power, network access node 110 may send to terminal device 102 power control feedback (e.g. a message) that instructs terminal device 102 to increase its uplink transmit power. Conversely, if network access node 110 determines that it receives terminal device 102's transmissions with excessively high power, network access node 110 may send to terminal device 102 power control feedback (e.g. a message) that instructs terminal device 102 to decrease its uplink transmit power. This type of power control feedback is termed transmit power control (TPC) in some 3GPP standards.

In some cases, the power control feedback may indicate a power adjustment, meaning a power increase or a power decrease by which terminal device 102 should adjust its power. In some aspects, the power control feedback may explicitly indicate a power adjustment (e.g., an explicit field that identifies a power increase or power decrease). In some aspects, the power control feedback may implicitly indicate a power adjustment, such as where the power control feedback explicitly identifies an updated transmit power (where the power adjustment is the difference between the current and updated transmit powers) or where the power control feedback identifies a predefined power increase or predefined power decrease.

When it transmits the blocks of payload data for the candidate transmit antenna beams in stage 612, controller 512 may therefore receive and record the power control feedback from network access node 110. For example, digital transmitter 510 may transmit (via RF transceiver 504 and antenna array 502) the blocks of payload data for each of the plurality of candidate beams in stage 612. Digital transmitter 510 may transmit with a current transmit power, such as the transmit power that network access node 110 previously assigned to terminal device 102.

Network access node 110 may receive the blocks of payload data and decide whether to instruct terminal device 102 to increase, decrease, or maintain its current transmit power. If network access node 110 decides to increase terminal device 102's transmit power, it may send power control feedback that instructs terminal device 102 to increase its transmit power by a positive power adjustment. Conversely, if network access node 110 decides to decrease terminal device 102's transmit power, it may send power control feedback that instructs terminal device 102 to decrease its transmit power by a negative power adjustment. If network access node 110 decides to maintain terminal device 102's transmit power, it may not send any power control feedback.

Terminal device 102 may then observe the power control feedback connected to the blocks of payload data for each candidate transmit antenna beam in stage 614. Then, terminal device 102 may select a transmit antenna beam based on the power control feedback in stage 616. For instance, terminal device 102 may select the transmit antenna beam based on which candidate transmit antenna beams triggered few or no positive power adjustments. When network access node 110 transmits power control feedback with a positive power adjustment, it likely means that network access node 110 received the signal with low signal power. Thus, positive power adjustments can indicate that terminal device 102's transmit antenna beam is not steered in the right direction. Thus, when terminal device 102 transmits a block of payload data with a candidate transmit beam that is steered in the wrong direction, there is a higher chance that network access node 110 will respond with power control feedback that requests a positive power adjustment. On the other hand, when terminal device 102 transmits a block of payload data with a candidate transmit beam that is steered directly toward network access node 110, there is a higher chance that network access node 110 will not respond with any power control feedback (e.g., maintain terminal device 102's current transmit power), or will respond with power control feedback that requests a negative power adjustment.

In other words, positive power adjustments may indicate that a candidate transmit antenna beam is a poor choice, while negative or no power adjustments may indicate that a candidate transmit beam is a suitable choice. Controller 512 may therefore observe the power control feedback for each candidate transmit power beam and identify which candidate transmit power beams trigger few or no positive power adjustments. For instance, network access node 110 may send power control feedback in response to signals that terminal device 102 recently transmitted. Controller 512 may therefore observe the power control feedback in response to the blocks of payload data, and observe the power control feedback for each of the plurality of candidate transmit antenna beams (mapped to specific blocks of payload data). That is, controller 512 may record whether each candidate transmit antenna beam prompts positive, negative, or no power adjustments from network access node 110.

Controller 512 may then select the transmit antenna beam based on the number of positive and negative power adjustments prompted by the different candidate transmit antenna beams. In one example, controller 512 may identify which candidate transmit antenna beam prompts the fewest positive power adjustments, and select that candidate transmit antenna beam as the transmit antenna beam. Additionally, in some controller 512 may use negative power adjustments as a second, tiebreaking criteria, such as by i) identifying the candidate transmit antenna beams with the fewest positive power adjustments, and ii) if there are multiple candidate transmit antenna beams tied for the fewest positive power adjustments, identifying from those the candidate transmit antenna beam that has the most negative power adjustments. Controller 512 may select that candidate transmit antenna beam as the transmit antenna beam in stage 616.

In another example with power control feedback, controller 512 may select the transmit antenna beam by summing the power adjustments for the candidate transmit antenna beams. For instance, controller 512 may identify all the power adjustments, positive and negative, for each candidate transmit antenna beam, and then sum those power adjustments to get a power adjustment total (e.g., the sum of power adjustments across all transmitted blocks of payload data for each candidate transmit antenna beam). Controller 512 may then identify the candidate transmit antenna beam with the lowest power adjustment total, and select that candidate transmit antenna beam as the transmit antenna beam in stage 616.

Accordingly, with flow chart 600, terminal device 102 may beamsweep with payload data and select a transmit antenna beam based on retransmission or power control feedback. As discussed above, terminal device 102 may not need to wait for network access node 110 to schedule dedicated transmit beamsweeping; terminal device 102 may instead execute stages 612-616 without waiting for network access node 110. Additionally, because terminal device 102 transmits payload data during the beamsweeping, terminal device 102 may not need to use power or occupy radio resources when performing transmit beamsweeping. This extends battery life and improve radio resource efficiency.

In some aspects, terminal device 102 may execute this type of transmit beamsweeping with a 3GPP radio access technology, such as LTE or 5G NR. In such cases, controller 512 may generate some of the blocks of payload data as, for example, physical upload shared channel (PUSCH) instances. One or more of the blocks of payload data may therefore be a PUSCH transport blocks. In one example where controller 512 maps blocks of payload data to candidate transmit antenna beams by alternating, controller 512 may assign PUSCH instances 1, 3, 5, and 7 to a first candidate transmit bean, and PUSCH instances 2, 4, 6, and 8 to a second candidate transmit beam. With that mapping, digital transmitter 510 may alternate between transmitting blocks of payload data with the first and second candidate transmit beams.

In some aspects, controller 512 may be configured to select the overall pool of blocks of payload data based on the priority of data. For instance, controller 512 may look at all the blocks of payload data that are scheduled for transmission, and may select the overall pool of blocks of payload data based on their data priority. Controller 512 may then allocate the overall pool of blocks of payload data to the plurality of candidate transmit antenna beams, but may not perform transmit beamsweeping with the other blocks of payload data. To take one example, controller 512 may select the overall pool of blocks of payload data with predefined priority rules. For instance, controller 512 may only sweep a given block of payload data (e.g., include it in the overall pool) if the block of payload data contains lower priority data, such as MAC service data units (SDUs) as opposed to MAC control elements (CEs; or equivalently other control data). Thus, controller 512 may not perform transmit beamsweeping on important data. This can help avoid losing important data, such as if terminal device 102 tried to transmit critical data with a poor candidate transmit antenna beam and network access node 110 could not receive it.

In some aspects, controller 512 may use padding so that only part of the blocks of payload data carry useful information. This can provide further protection against data loss, as a lost block of payload data will lose only some payload data instead of an entire block (e.g., an entire PUSCH transport block). For example, in some aspects controller 512 may be configured as a media access control (MAC) layer and digital transmitter 510 may be configured as a physical (PHY) layer. Controller 512 may therefore obtain layer input data (e.g., any type of user-plane or control plane data) and perform MAC processing on the layer input data to obtain layer output data. Using 3GPP terminology as an example, the layer input data is termed a MAC SDU (service data unit; e.g., a single block of the layer input data) and the layer output data is termed a MAC PDU (protocol data unit; e.g., a single block of the layer output data). Controller 512, acting as a MAC layer, may provide the layer output data to digital transmitter 510, which acts as a PHY layer. Digital transmitter 510 may treat the MAC PDUs its layer input data (e.g., PHY SDUs) and may perform PHY processing on the layer input data to obtain its layer output data (e.g., PHY PDUs). Digital transmitter 510 may then transmit its layer output data via RF transceiver 504 and antenna system 502.

As part of its MAC processing, controller 512 may insert padding bits into the MAC PDUs. The MAC PDUs (transport blocks) may therefore include information bits and padding bits, where the information bits carry header and information data (carrying the MAC layer input data) and the padding bits are arbitrary bits that do not carry useful information. The ratio of padding bits to information bits is termed the padding ratio, where increasing the padding ratio means increasing the number of padding bits relative to the number of information bits.

Figure 8:
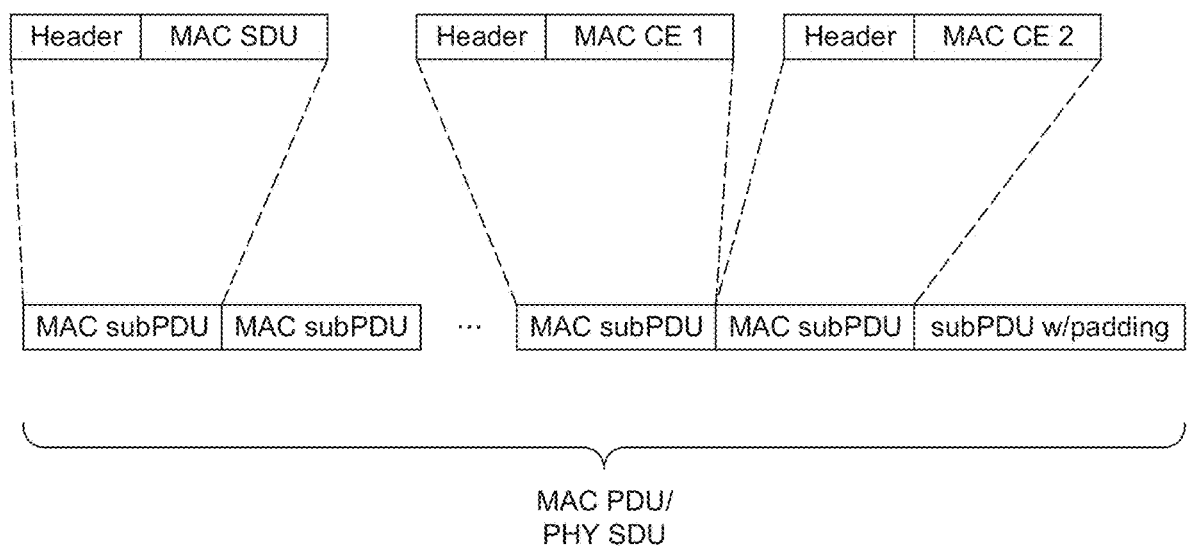
FIG. 8 shows an exemplary illustration of generating media access control (MAC) transport blocks according to some aspects.

FIG. 8 shows an example of MAC processing according to some aspects. Acting as a MAC layer, controller 512 may obtain MAC SDUs from an upper layer (e.g., part of controller 512, or from another component). Controller 512 may attach a header to the MAC SDUs to obtain MAC subPDUs. Controller 612 may also generate MAC control elements (CEs) and attach headers to the MAC CEs to obtain other MAC subPDUs. In FIG. 8's example, there are two MAC CEs—CE 1 and CE 2—where MAC CE 1 has a fixed size and MAC CE 2 has a variable size. In some aspects, the header for a given MAC subPDU may indicate the format of the MAC SDU (e.g., whether it includes a MAC SDU or a variable- or fixed-size MAC CE), the logical channel (e.g., the logical channel that carries the MAC SDU), and/or the length of the MAC SDU. This format is described in 3GPP TS 38.321 for a 3GPP example.

As FIG. 8 shows, controller 512 may also be configured to insert optional padding into the MAC PDUs. For instance, controller 512 may generate a MAC subPDU that includes padding bits. In contrast to the MAC SDUs carried in other MAC subPDUs, these padding bits may be arbitrary and may not carry useful information. Though the padding bits do not carry useful information, the MAC headers in a transport block do carry useful information, and these transport blocks are thus still considered blocks of payload data. When controller 512 inserts padding into a given MAC PDU, it may generate a header identifying the MAC subPDU as a padding subPDU (e.g., using a logical channel field in the header) and then insert padding bits into the MAC subPDU.

For the transmit beamsweeping of this disclosure, controller 512 may adjust the padding to help protect the blocks of payload data. For instance, controller 512 may treat the MAC PDUs as the blocks of payload data for transmit beamsweeping, where one MAC PDU forms one block of payload data. Controller 512 can then use a large padding ratio to help avoid excessive loss of payload data. As introduced above, a large padding ratio means a larger number of padding bits (e.g., a large subPDU with padding in the MAC PDU) than information bits. Thus, if controller 512 generates a given block of transport data (MAC PDU) with a high padding ratio, that block of transport data will have a large amount of padding bits relative to information bits (e.g., the subPDU padding will be large). If terminal device 102 transmits that block of payload data with a poor candidate transmit antenna beam that (e.g., that does not point at network access node 110), network access node 110 may not be able to receive and decode the block of payload data. As such, the block payload data will be lost, and terminal device 102 may need to retransmit it. However, if the padding ratio is high, most of the lost data will be padding bits, not information bits. Because only a small amount of information bits are lost, the data loss is mitigated. Conversely, if the padding ratio is low, most of the lost data will be information bits. This data loss can be considerably worse.

Figure 9:
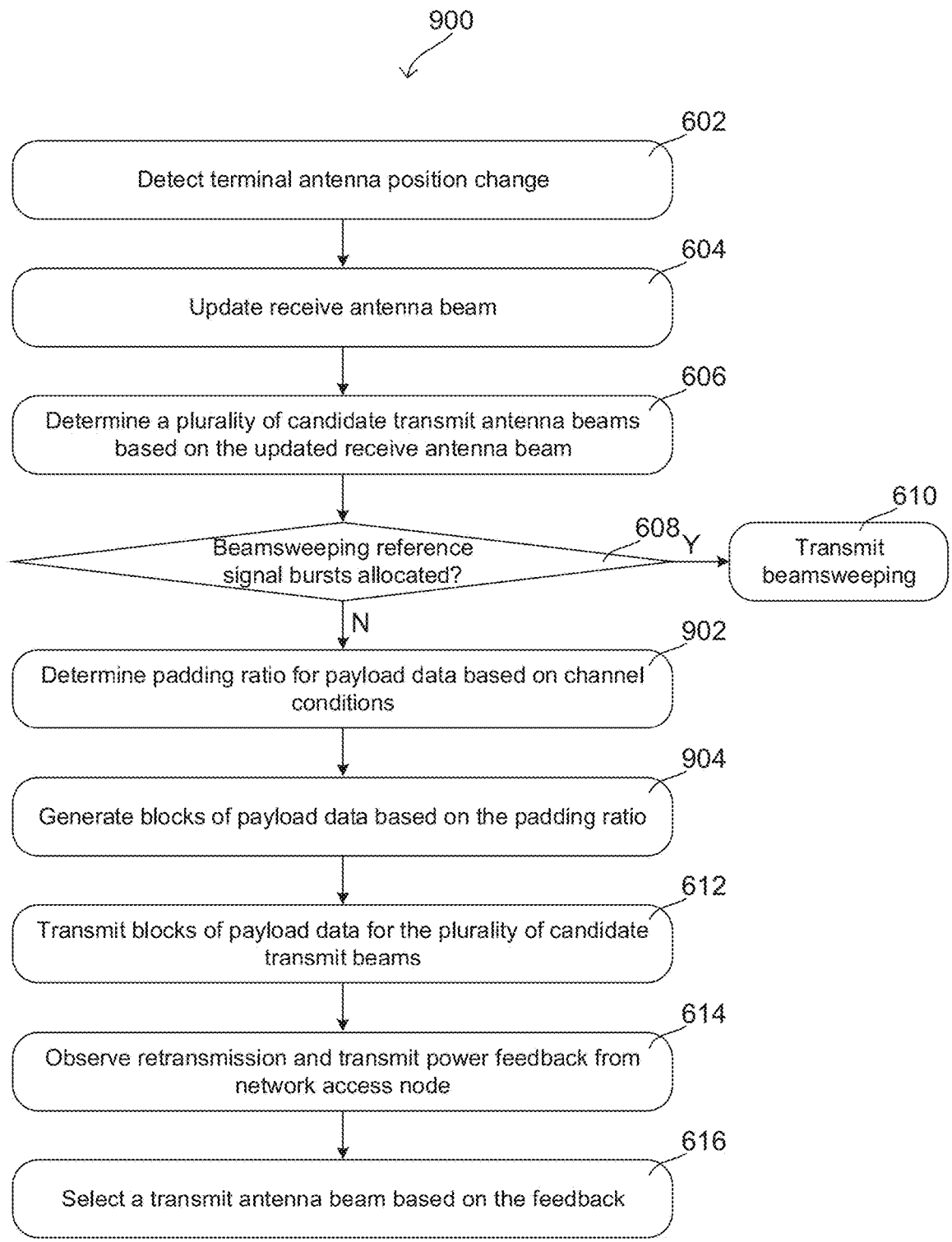
FIG. 9 shows an exemplary flow chart for a method of transmit beamsweeping with payload data using variable padding ratios according to some aspects.

To help mitigate the impacts of payload data loss, controller 512 may adjust the padding ratio of the blocks of payload data (e.g., transport blocks) when it performs transmit beamsweeping on payload data. FIG. 9 shows exemplary flow chart 900 illustrating an example of this according to some aspects. As FIG. 9 shows, terminal device 102 may perform stages 602-616 of flow chart 900 in the same manner as stages 602-616 of flow chart 600 in FIG. 6. Accordingly, controller 512 may update its receive antenna beam with receive beamsweeping, select a plurality of candidate transmit antenna beams to beamsweep, decide whether to perform dedicated transmit beamsweeping or transmit beamsweeping with payload data, sweep across the plurality of candidate transmit antenna beams with blocks of payload data, and use the resulting feedback to select a transmit antenna beam.

In addition, for flow chart 900 terminal device 102 may also perform stages 902-904 to adjust the padding ratio of the blocks of payload data used for transmit beamsweeping. That is, while terminal device 102 may perform largely the same procedure as flow chart 600, terminal device 102 may also adjust the blocks of payload data to vary their padding ratio. As shown in FIG. 9, after controller 512 selects the plurality of candidate transmit antenna beams (stage 606) and decides to perform transmit beamsweeping with payload data (stage 608), controller 512 may determine a padding ratio for the payload data in stage 902. For instance, in stage 902 controller 512 may determine a padding ratio to use for the blocks of payload data used for the transmit beamsweeping, where the padding ratio is the ratio of padding to information bits in the blocks of payload data (e.g., transport blocks or MAC PDUs).

In some aspects, controller 512 may determine the padding ratio based on channel conditions for terminal device 102. For instance, if terminal device 102 has a reliable radio link with network access node 110, controller 512 may select a lower padding ratio. This means that the blocks of payload data will include more information bits and less padding bits. Because channel conditions are strong, there is a higher likelihood network access node 110 will be able to receive and decode the blocks of payload data, especially when terminal device 102 transmits with a poor candidate transmit antenna beam. Thus, it may not be as important for terminal device 102 to mitigate data loss, meaning a lower padding ratio is justified. Conversely, if terminal device 102 has a weak radio link with network access node 110, controller 512 may select a higher padding ration. Because channel conditions are weak, there is a higher chance that the blocks of payload data will be lost, particularly when terminal device 102 uses a candidate transmit antenna beam that is not pointed at network access node 110. When blocks of payload data are lost, less of the lost data will be information bits. Using a higher padding ratio can therefore help to mitigate the data loss.

In one example, digital receiver 508 may perform radio measurements on signal received from network access node 110, and controller 512 may then use the radio measurements to determine the padding ratio in stage 902. For instance, digital receiver 508 may be configured with measurement circuitry, and may receive and process signals from network access node 110 to determine radio measurements. These radio measurements can be, for example, signal strength or signal quality measurements. In some aspects, digital receiver 508 may estimate the pathloss or propagation range based on the radio measurements. Though the radio measurements may be downlink measurements, estimating the pathloss or propagation range based on the radio measurements may indicate the strength or quality of the uplink channel. In other aspects, digital transmitter 510 may obtain a timing advance (TA) that it uses to time its transmissions so they arrive at network access node 110 according to a set timing schedule. When terminal device 102 is far from network access node 110, transmissions need to travel farther, and so the timing advance is larger. Conversely, when terminal device 102 is close to network access node 110, transmissions do not need to travel as far, and so the timing advance is smaller. Thus, the timing advance also indicates propagation range.

Controller 512 may then use the pathloss, propagation range, or timing advance to select the padding ratio in stage 902. Herein, these metrics are collectively termed uplink channel indicators. If the uplink channel indicators indicate a poor uplink channel (e.g., high pathloss, high propagation range, or large timing advance), controller 512 may select a higher padding ratio. That is, if the radio link with network access node 110 is likely poor, controller 512 may insert more padding bits into the blocks of transport data. As explained above, this can help mitigate data loss. Conversely, if the uplink channel indicators indicate a strong uplink channel, controller 512 may select a lower padding ratio. Thus, if the radio link with network access node 110 is strong, controller 512 may insert fewer padding bits into the blocks of transport data. Since the rate of data loss is likely low, controller 512 may not need to mitigate data loss as aggressively.

In some aspects, controller 512 may use a predefined mapping of radio measurements to padding ratios, where uplink channel indicators indicating a poor channel map to higher padding ratios and where uplink channel indicators indicating a strong channel map to lower padding ratios. When it obtains an uplink channel indicator from digital receiver 508, controller 512 may use the predefined mapping to determine which padding ratio maps to the uplink channel indicator's value. Controller 512 may then select that padding ratio in stage 902. By doing so, controller 512 may select a padding ratio based on the channel conditions.

After controller 512 selects a padding ratio, controller 512 may generate blocks of payload data with the padding ratio in stage 904. These are the blocks of payload data that controller 512 uses for the transmit beamsweeping. As described for one example in FIG. 8, controller 512 may be configured to receive layer input data from upper layers and to process that layer input data to obtain layer output data, where the layer output data is the blocks of payload data. As part of that processing, controller 512 may be configured to add headers to the layer input data and, optionally, to add padding bits. Thus, in stage 904 controller 512 may add padding bits to the layer input data, generate headers for the layer output data, and partition the layer output data to form blocks of payload data that have a ratio of padding bits to information bits. In some aspects, controller 512 may use the exemplary procedure described above for FIG. 8, such as where controller 512 acts as a MAC layer, processing MAC SDUs to generate MAC PDUs and including a MAC subPDU with padding bits in the MAC PDU. Controller 512 may select the number of MAC SDUs, the size of MAC SDUs, and the size of the MAC subPDU with padding (e.g., the number of padding bits) based on the padding ratio, where the padding ratio controls the number of padding bits to information bits in the resulting MAC PDU. In this example, each MAC PDU may be a block of payload data (e.g., a transport block), which controller 512 may provide to digital transmitter 508.

In the same manner as flow chart 600, digital transmitter 508 may receive the blocks of payload data from controller 512 and then transmit the blocks of payload data for the plurality of candidate transmit beams in stage 612. Acting as a PHY layer, digital transmitter 508 may then perform PHY processing on each block of payload data (e.g., treating it as a PHY SDU) and transmit the blocks of payload data via RF transceiver 504 and antenna array 504. Controller 512 may then observe the retransmission and transmit power feedback in stage 614 and select a transmit antenna beam based on the feedback in stage 616.

Figure 10:
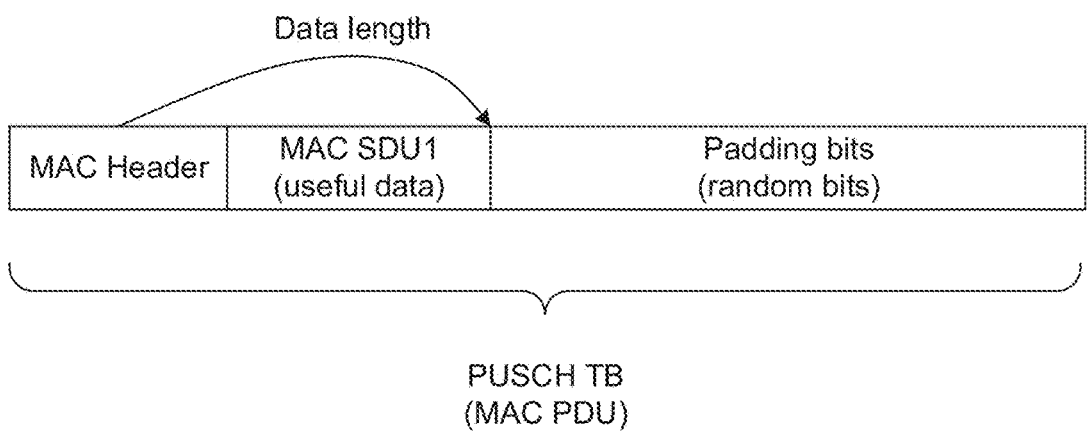
FIG. 10 shows an example of a transport block with header and padding bits according to some aspects.

By selecting the padding ratio in this manner, controller 512 may help mitigate for data loss, especially when some of the candidate transmit beams are not pointed at network access node 110. Thus, even when some of the candidate transmit antenna beams are not pointed at network access node 110, controller 512 may avoid excessive data loss. That is, to protect the payload data, terminal device 102 may use MAC padding to fill only part of the transport blocks (e.g., PUSCH transport blocks) with useful data (a subset of MAC SDUs) while filling the other space with padded bits. Controller 512 may program the MAC headers of the transport blocks with reduced data length, so if network access node 110 successfully decodes the transport block, it can still pick up the information bits (based on the MAC header) while discarding the padding bits. In an extreme case, controller 512 may fill the blocks of payload data with padding bits while the MAC header data length is configured as 0. This results in a completely empty transport block, which can be viewed as a probe signal to probe the transmit beam quality while the information bits (useful uplink data) are fully protected within terminal device 102's data buffer. FIG. 10 shows an example of this according to some aspects. As shown in FIG. 10, controller 512 may, in some aspects, generate the blocks of payload data as PUSCH transport blocks (TBs), which are equivalent to MAC PDUs. Controller 512 may obtain a MAC SDU from the upper layers that includes information bits (useful data). Based on the padding ratio, controller 512 may add padding bits to the MAC SDU. Controller 512 may then attach a MAC header to the MAC SDU and padding bits, where the header indicates the length of the PUSCH TB. Because the padding bits are not useful information, controller 512 may indicate in the header that the PUSCH TB is as long as the MAC SDU, meaning that the length does not include the padding bits. Thus, when network access node 110 successfully decodes the PUSCH TB, it can still pick up only the useful data—the MAC SDU—based on the MAC header. The padding bits are not useful data, and network access node 110 may not need to decode them.

As previously described, controller 512 may identify an overall pool of blocks of payload data that it will use for transmit beamsweeping. In some aspects, controller 512 may identify the overall pool based on the priority of information in the payload data. For instance, some payload data may be high-priority data, like critical control channels, while other payload data may be less important, such as video or voice data. Because transmit beamsweeping with payload data can increase the likelihood of losing the data, in some aspects controller 512 may select blocks of payload data with lower priority information and include those blocks of payload data in the overall pool. Controller 512 may identify other blocks of payload data with higher priority information and leave those blocks of payload data out of the overall pool. As there is an increased risk of data loss, with this technique controller 512 can avoid losing critical data. Instead, controller 512 may transmit beamsweep with lower priority information, and transmit the higher priority information without transmit beamsweeping. In some aspects, controller 512 may classify blocks of payload data as high priority or low priority based on priority information such as quality of service (QoS) indicators or based on logical channels (e.g., logical channels that carry control data as high priority and logical channels that carry user data as low priority).

In some aspects, controller 512 may dynamically adapt the padding ratio based on the feedback from network access node 110. For instance, as controller 512 receives retransmission and transmit power feedback from network access node 110, controller 512 may be able to estimate which candidate transmit antenna beams are suitable and which are poor. Controller 512 may then use a higher padding ratio for poor candidate transmit antenna beams, and use a lower padding ratio for strong candidate transmit antenna beams. In one example using retransmission feedback, controller 512 may initially transmit blocks of payload data with different candidate transmit antenna beams and receive retransmission feedback for the candidate transmit antenna beams. While the transmit beamsweeping procedure is still ongoing, controller 512 may calculate a tentative retransmission rate for each candidate transmit antenna beam based on the retransmission feedback received so far. Though the tentative retransmission rates may not be fully accurate yet, controller 512 may still use them to select padding ratios to transmit other blocks of payload data for the candidate transmit antenna beams. For instance, controller 512 may select lower padding ratios for candidate transmit antenna beams that have low tentative retransmission rates, and may select higher padding ratios for candidate transmit antenna beams that have higher tentative retransmission rates. Controller 512 may then generate the next blocks of payload data for the candidate transmit antenna beams based on these different padding ratios. With this approach, controller 512 may provide more protection to the payload data for poor candidate transmit antenna beams (those having high tentative retransmission rates) and less protection to the payload data for strong candidate transmit antenna beams (those having low tentative retransmission rates).

Similarly, when using transmit power feedback, controller 512 may transmit blocks of payload data with the plurality of candidate transmit antenna beams and receive transmit power feedback in response. Controller 512 may then determine a tentative count of positive power adjustments (or, similarly, a tentative sum of power adjustments) for the different candidate transmit antenna beams. Using the tentative count of positive power adjustments, controller 512 may select higher padding ratios for candidate transmit antenna beams with higher tentative counts and select lower padding ratios for candidate transmit antenna beams with lower tentative counts. Because higher tentative counts of positive power adjustments can indicate a poor candidate transmit antenna beam, controller 512 may provide more protection to payload data that has higher chance of being lost. If using a tentative sum of power adjustments, controller 512 may similarly select higher padding ratios for candidate transmit antenna beams with higher tentative sums and select lower padding ratios for candidate transmit antenna beams with lower tentative sums.

In some aspects, controller 512 may also select the padding ratio in stage 902 based on the operating band. For instance, higher bands like 39 GHz have higher signal attenuation than lower bands like 28 GHz. As such, controller 512 may select higher padding ratios for higher operating bands and lower padding ratios for lower operating bands. With this, controller 512 may provide more protection to payload data when operating at higher frequencies with greater signal attenuation.

As explained above, one issue with dedicated transmit beamsweeping is that network access node 110 does not know when terminal device 102 updates its receive antenna beam. As a result, network access node 110 will not know when to schedule dedicated transmit beamsweeping. Terminal device 102 will be stuck with the prior transmit antenna beam until network access node 110 eventually scheduled dedicated transmit beamsweeping. Thus, in some aspects, controller 512 may use the padding bits in the blocks of transport data to send a dedicated message to network access node. This dedicated message may request network access node 110 to schedule dedicated transmit beamsweeping for terminal device 102. For instance, when generating blocks of payload data, controller 512 may insert a predefined message into the padding bits. Taking FIG. 8's example, controller 512 may insert the predefined message into the MAC subPDU with padding. The predefined message may be a predefined bit string that is agreed on in advance by network access node 110 and terminal device 102.

Thus, when terminal device 102 updates its receive antenna beam, controller 512 may trigger dedicated transmit beamsweeping by inserting the predefined message into the padding bits of a block of payload data and sending the block of payload data to network access node 110 (e.g., by providing it to digital transmitter 510 for transmission). Because network access node 110 knows the predefined message in advance, network access node 110 may detect the predefined message when it decodes the block of payload data. This informs network access node 110 that terminal device 102 is requesting dedicated transmit beamsweeping. Recognizing this, network access node 110 may then schedule dedicated transmit beamsweeping for terminal device 102. Terminal device 102 may then use the dedicated transmit beamsweeping to send beamsweeping reference signals with the plurality of candidate transmit antenna beams, and network access node 110 may report back which candidate transmit antenna beams yielded the highest received signal power. Terminal device 102 may then select a transmit antenna beam based on that feedback.

FIG. 11 shows exemplary method 1100 of performing beamsweeping at a wireless device according to some aspects. As shown in FIG. 11, method 1100 includes transmitting, with a first candidate antenna beam, a first plurality of blocks of payload data (stage 1102), transmitting, with a second candidate antenna beam, a second plurality of blocks of payload data (stage 1104), receiving, from a receiver device, feedback on the first plurality of blocks and the second plurality of blocks that requests retransmission or a transmit power adjustment (stage 1106), selecting, based on the feedback, a candidate antenna beam as a transmit antenna beam (stage 1108), and transmitting payload data to the receiver device with the transmit antenna beam (stage 1110).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a method of performing beamsweeping at a wireless device, the method including transmitting, with a first candidate antenna beam, a first plurality of blocks of payload data, transmitting, with a second candidate antenna beam, a second plurality of blocks of payload data, receiving, from a receiver device, feedback on the first plurality of blocks and the second plurality of blocks that requests retransmission or a transmit power adjustment, selecting, based on the feedback, a candidate antenna beam as a transmit antenna beam, and transmitting payload data to the receiver device with the transmit antenna beam.

In Example 2, the subject matter of Example 1 can optionally include wherein the feedback includes one or more acknowledgements (ACKs) or negative acknowledgements (NACKs) that indicate whether the receiver device successfully received the first plurality of blocks of payload data or the second plurality of blocks of payload data.

In Example 3, the subject matter of Example 1 or 2 can optionally further include determining, based on the feedback, a retransmission rate for the first candidate antenna beam and a retransmission rate for the second candidate antenna beam, wherein selecting the transmit antenna beam is based on the retransmission rate for the first candidate antenna beam and the retransmission rate for the second candidate antenna beam.

In Example 4, the subject matter of Example 1 or 2 can optionally further include determining, based on the feedback, retransmission rates for a plurality of candidate antenna beams that include the first candidate antenna beam and the second candidate antenna beam, wherein selecting the transmit antenna beam includes identifying, from the plurality of candidate antenna beams, a candidate transmit antenna beam that has the lowest retransmission rate, and selecting the identified candidate transmit antenna beam as the transmit antenna beam.

In Example 5, the subject matter of Example 1 can optionally include wherein the feedback includes one or more transmit power adjustments that request the wireless device to increase or decrease its transmit power.

In Example 6, the subject matter of Example 1 can optionally further include receiving transmit power adjustments for a plurality of candidate antenna beams that include the first candidate antenna beam and the second candidate antenna beam, wherein selecting the candidate antenna beam as the transmit antenna beam based on the feedback includes selecting, from the plurality of candidate antenna beams, the candidate antenna beam based on a number of positive power adjustments received for the candidate antenna beam.

In Example 7, the subject matter of Example 6 can optionally include wherein the positive power adjustments request the wireless device to increase its transmit power, and wherein the positive power adjustments are received in response to one or more blocks of payload data transmitted with the candidate antenna beam.

In Example 8, the subject matter of Example 6 can optionally include wherein selecting, from the plurality of candidate antenna beams, the candidate antenna beam includes identifying which candidate antenna beam of the plurality of candidate antenna beams has a lowest number of positive power adjustments, and selecting the identified candidate antenna beam as the transmit antenna beam.

In Example 9, the subject matter of any one of Examples 5 to 8 can optionally include wherein the transmit power adjustments are transmit power control (TPC) commands.

In Example 10, the subject matter of any one of Examples 1 to 9 can optionally further include before transmitting the first plurality of blocks of payload data, performing a receive beamsweeping procedure to select a receive antenna beam for receiving payload data from the receiver device, and selecting a plurality of candidate antenna beams, including the first candidate antenna beam and the second candidate antenna beam, based on the receive antenna beam, wherein selecting the candidate antenna beam as the transmit antenna beam includes selecting the candidate antenna beam from the plurality of candidate antenna beams based on the feedback.

In Example 11, the subject matter of Example 10 can optionally include wherein selecting the plurality of candidate antenna beams based on the receive antenna beam includes identifying one or more predefined transmit antenna beams that neighbor the receive antenna beam in steering direction, and including the one or more predefined transmit antenna beams in the plurality of candidate antenna beams.

In Example 12, the subject matter of Example 10 can optionally include wherein selecting the plurality of candidate antenna beams based on the receive antenna beam includes identifying one or more predefined transmit antenna beams based on a predefined mapping that maps different receive antenna beams to different candidate transmit antenna beams based on spatial correspondence, and including the one or more predefined transmit antenna beams in the plurality of candidate antenna beams.

In Example 13, the subject matter of any one of Examples 1 to 10 can optionally include wherein the payload data is user-plane or control-plane data that carries information bits.

In Example 14, the subject matter of any one of Examples 1 to 13 can optionally include wherein the first plurality of blocks of payload data are transport blocks (TBs).

In Example 15, the subject matter of any one of Examples 1 to 14 can optionally further include selecting an overall pool of blocks of payload data to use for transmit beamsweeping over a plurality of candidate antenna beams that include the first candidate antenna beam and the second candidate antenna beam, assigning a first subset of the overall pool of blocks of payload data to the first plurality of blocks of payload data, and assigning a second subset of the overall pool of blocks of payload data to the second plurality of blocks of payload data.

In Example 16, the subject matter of Example 15 can optionally include wherein selecting the overall pool of blocks of payload data includes selecting the overall pool of blocks of payload data based on a priority of data contained in the overall pool of blocks of payload data.

In Example 17, the subject matter of any one of Examples 1 to 16 can optionally further include obtaining information that indicates a quality of a wireless channel between the wireless device and the receiver device, selecting a padding ratio based on the quality of the wireless channel indicated by the information, and generating the first plurality of blocks of payload data to include a number of padding bits depending on the padding ratio.

In Example 18, the subject matter of Example 17 can optionally include wherein the padding bits are arbitrary bits that do not carry useful information, and wherein the padding ratio controls a ratio of padding bits to information bits in the first plurality of blocks of payload data.

In Example 19, the subject matter of Example 17 or 18 can optionally include wherein the information is an estimated pathloss of the wireless channel, an estimated propagation range of the wireless channel, or a timing advance of the wireless channel.

In Example 20, the subject matter of Example 17 or 18 can optionally include wherein the information includes the feedback on the first plurality of blocks and the second plurality of blocks that requests retransmission or a transmit power adjustment.

In Example 21, the subject matter of any one of Examples 17 to 19 can optionally further include increasing the padding ratio if the information indicates a decrease in the quality of the wireless channel, and decreasing the padding ratio if the information indicates an increase in the quality of the wireless channel.

In Example 22, the subject matter of any one of Examples 1 to 21 can optionally include wherein transmitting the payload data to the receiver device with the transmit antenna beam includes configuring an antenna array to transmit with the transmit antenna beam, and transmitting the payload data via the antenna array.

In Example 23, the subject matter of Example 22 can optionally include wherein configuring the antenna array to transmit with the transmit antenna beam includes setting a plurality of phase shifters to a set of beamforming weights for the transmit antenna beam, wherein the plurality of phase shifters connect to different antenna elements of the antenna array.

Example 24 is a digital processing chip arrangement including a digital transmitter configured to transmit, via an antenna array, a first plurality of blocks of payload data with a first antenna beam, and to transmit, via the antenna array, a second plurality of blocks of payload data with a second antenna beam, a digital receiver configured to receive, via the antenna array, feedback on the first plurality of blocks and the second plurality of blocks that requests retransmission or transmit power adjustment, and a controller configured to select, based on the feedback, an antenna beam as a transmit antenna beam, the digital transmitter further configured to transmit, via the antenna array, payload data to the receiver with the transmit antenna beam.

In Example 25, the subject matter of Example 24 can optionally include wherein the feedback includes one or more acknowledgements (ACKs) or negative acknowledgements (NACKs) that indicate whether the receiver device successfully received the first plurality of blocks of payload data or the second plurality of blocks of payload data.

In Example 26, the subject matter of Example 24 or 25 can optionally include wherein the controller is further configured to determine, based on the feedback, a retransmission rate for the first candidate antenna beam and a retransmission rate for the second candidate antenna beam, and wherein the controller is configured to select the transmit antenna beam based on the retransmission rate for the first candidate antenna beam and the retransmission rate for the second candidate antenna beam.

In Example 27, the subject matter of Example 24 or 25 can optionally include wherein the controller is further configured to determine, based on the feedback, retransmission rates for a plurality of candidate antenna beams that include the first candidate antenna beam and the second candidate antenna beam, and wherein the controller is configured to select the transmit antenna beam by identifying, from the plurality of candidate antenna beams, a candidate transmit antenna beam that has the lowest retransmission rate, and selecting the identified candidate transmit antenna beam as the transmit antenna beam.

In Example 28, the subject matter of Example 24 can optionally include wherein the feedback includes one or more transmit power adjustments that request the digital signal processing chip arrangement to increase or decrease its transmit power.

In Example 29, the subject matter of Example 24 can optionally include wherein the digital receiver is further configured to receive transmit power adjustments for a plurality of candidate antenna beams that include the first candidate antenna beam and the second candidate antenna beam, and wherein the controller is configured to select the candidate antenna beam as the transmit antenna beam based on the feedback by selecting, from the plurality of candidate antenna beams, the candidate antenna beam based on a number of positive power adjustments received for the candidate antenna beam.

In Example 30, the subject matter of Example 29 can optionally include wherein the positive power adjustments request the digital processing chip arrangement to increase its transmit power, and wherein the digital receiver is configured to receive the positive power adjustments in response to one or more blocks of payload data transmitted with the candidate antenna beam.

In Example 31, the subject matter of Example 30 can optionally include wherein the controller is configured to select, from the plurality of candidate antenna beams, the candidate antenna beam by identifying which candidate antenna beam of the plurality of candidate antenna beams has a lowest number of positive power adjustments, and selecting the identified candidate antenna beam as the transmit antenna beam.

In Example 32, the subject matter of any one of Examples 28 to 31 can optionally include wherein the transmit power adjustments are transmit power control (TPC) commands.

In Example 33, the subject matter of any one of Examples 24 to 32 can optionally include wherein the digital receiver is further configured to, before the digital transmitter transmits the first plurality of blocks of payload data, perform a receive beamsweeping procedure to select a receive antenna beam for receiving payload data from the receiver device, and wherein the controller is configured to select a plurality of candidate antenna beams, including the first candidate antenna beam and the second candidate antenna beam, based on the receive antenna beam, and wherein the controller is configured to select the candidate antenna beam from the plurality of candidate antenna beams based on the feedback.

In Example 34, the subject matter of Example 33 can optionally include wherein the controller is configured to select the plurality of candidate antenna beams based on the receive antenna beam by identifying one or more predefined transmit antenna beams that neighbor the receive antenna beam in steering direction, and including the one or more predefined transmit antenna beams in the plurality of candidate antenna beams.

In Example 35, the subject matter of Example 33 can optionally include wherein the controller is configured to select the plurality of candidate antenna beams based on the receive antenna beam by identifying one or more predefined transmit antenna beams based on a predefined mapping that maps different receive antenna beams to different candidate transmit antenna beams based on spatial correspondence, and including the one or more predefined transmit antenna beams in the plurality of candidate antenna beams.

In Example 36, the subject matter of any one of Examples 24 to 33 can optionally include wherein the payload data is user-plane or control-plane data that carries information bits.

In Example 37, the subject matter of any one of Examples 24 to 36 can optionally include wherein the first plurality of blocks of payload data are transport blocks (TBs).

In Example 38, the subject matter of any one of Examples 24 to 37 can optionally include wherein the controller is further configured to select an overall pool of blocks of payload data to use for transmit beamsweeping over a plurality of candidate antenna beams that include the first candidate antenna beam and the second candidate antenna beam, assign a first subset of the overall pool of blocks of payload data to the first plurality of blocks of payload data, and assign a second subset of the overall pool of blocks of payload data to the second plurality of blocks of payload data.

In Example 39, the subject matter of Example 38 can optionally include wherein the controller is configured to select the overall pool of blocks of payload data by selecting the overall pool of blocks of payload data based on a priority of data contained in the overall pool of blocks of payload data.

In Example 40, the subject matter of any one of Examples 24 to 39 can optionally include wherein the controller is further configured to obtain information that indicates a quality of a wireless channel between the antenna array and the receiver device, select a padding ratio based on the quality of the wireless channel indicated by the information, and generate the first plurality of blocks of payload data to include a number of padding bits depending on the padding ratio.

In Example 41, the subject matter of Example 40 can optionally include wherein the padding bits are arbitrary bits that do not carry useful information, and wherein the padding ratio controls a ratio of padding bits to information bits in the first plurality of blocks of payload data.

In Example 42, the subject matter of Example 40 or 41 can optionally include wherein the information is an estimated pathloss of the wireless channel, an estimated propagation range of the wireless channel, or a timing advance of the wireless channel.

In Example 43, the subject matter of Example 40 or 41 can optionally include wherein the information includes the feedback on the first plurality of blocks and the second plurality of blocks that requests retransmission or a transmit power adjustment.

In Example 44, the subject matter of any one of Examples 40 to 42 can optionally include wherein the controller is further configured to increase the padding ratio if the information indicates a decrease in the quality of the wireless channel, and to decrease the padding ratio if the information indicates an increase in the quality of the wireless channel.

In Example 45, the subject matter of any one of Examples 24 to 44 can optionally include wherein, when the digital transmitter transmits the payload data to the receiver device with the transmit antenna beam, the controller is configured to configure the antenna array to transmit with the transmit antenna beam.

In Example 46, the subject matter of Example 45 can optionally include wherein the controller is configured to configure the antenna array to transmit with the transmit antenna beam by setting a plurality of phase shifters to a set of beamforming weights for the transmit antenna beam, wherein the plurality of phase shifters connect to different antenna elements of the antenna array.

Example 47 is a wireless device including a radio frequency transceiver, an antenna array, and one or more processors configured to transmit and receive signals with the radio frequency transceiver and the antenna array, and further configured to transmit, with a first antenna beam, a first plurality of blocks of payload data, transmit, with a second antenna beam, a second plurality of blocks of payload data, receive from a receiver device, feedback on the first plurality of blocks and the second plurality of blocks that requests retransmission or transmit power adjustments, select, based on the feedback, an antenna beam as a transmit antenna beam, and transmit payload data to the receiver device with the transmit antenna beam.

In Example 48, the subject matter of Example 47 can optionally include wherein the feedback includes one or more acknowledgements (ACKs) or negative acknowledgements (NACKs) that indicate whether the receiver device successfully received the first plurality of blocks of payload data or the second plurality of blocks of payload data.

In Example 49, the subject matter of Example 47 or 48 can optionally include wherein the one or more processors are further configured to determine, based on the feedback, a retransmission rate for the first candidate antenna beam and a retransmission rate for the second candidate antenna beam, and wherein the one or more processors are configured to select the transmit antenna beam based on the retransmission rate for the first candidate antenna beam and the retransmission rate for the second candidate antenna beam.

In Example 50, the subject matter of Example 47 or 48 can optionally include wherein the one or more processors are further configured to determine, based on the feedback, retransmission rates for a plurality of candidate antenna beams that include the first candidate antenna beam and the second candidate antenna beam, and wherein the one or more processors are configured to select the transmit antenna beam by identifying, from the plurality of candidate antenna beams, a candidate transmit antenna beam that has the lowest retransmission rate, and selecting the identified candidate transmit antenna beam as the transmit antenna beam.

In Example 51, the subject matter of Example 47 can optionally include wherein the feedback includes one or more transmit power adjustments that request the wireless device to increase or decrease its transmit power.

In Example 52, the subject matter of Example 47 can optionally include wherein the one or more processors are further configured to receive transmit power adjustments for a plurality of candidate antenna beams that include the first candidate antenna beam and the second candidate antenna beam, and configured to select the candidate antenna beam as the transmit antenna beam based on the feedback by selecting, from the plurality of candidate antenna beams, the candidate antenna beam based on a number of positive power adjustments received for the candidate antenna beam.

In Example 53, the subject matter of Example 52 can optionally include wherein the positive power adjustments request the wireless device to increase its transmit power, and wherein the one or more processors are configured to receive the positive power adjustments in response to one or more blocks of payload data transmitted with the candidate antenna beam.

In Example 54, the subject matter of Example 53 can optionally include wherein the one or more processors are configured to select, from the plurality of candidate antenna beams, the candidate antenna beam by identifying which candidate antenna beam of the plurality of candidate antenna beams has a lowest number of positive power adjustments, and selecting the identified candidate antenna beam as the transmit antenna beam.

In Example 55, the subject matter of any one of Examples 51 to 54 can optionally include wherein the transmit power adjustments are transmit power control (TPC) commands.

In Example 56, the subject matter of any one of Examples 47 to 55 can optionally include wherein the one or more processors are further configured to before transmitting the first plurality of blocks of payload data, perform a receive beamsweeping procedure to select a receive antenna beam for receiving payload data from the receiver device, select a plurality of candidate antenna beams, including the first candidate antenna beam and the second candidate antenna beam, based on the receive antenna beam, and select the candidate antenna beam from the plurality of candidate antenna beams based on the feedback.

In Example 57, the subject matter of Example 56 can optionally include wherein one or more processors are configured to select the plurality of candidate antenna beams based on the receive antenna beam by identifying one or more predefined transmit antenna beams that neighbor the receive antenna beam in steering direction, and including the one or more predefined transmit antenna beams in the plurality of candidate antenna beams.

In Example 58, the subject matter of Example 56 can optionally include wherein one or more processors are configured to select the plurality of candidate antenna beams based on the receive antenna beam by identifying one or more predefined transmit antenna beams based on a predefined mapping that maps different receive antenna beams to different candidate transmit antenna beams based on spatial correspondence, and including the one or more predefined transmit antenna beams in the plurality of candidate antenna beams.

In Example 59, the subject matter of any one of Examples 47 to 56 can optionally include wherein the payload data is user-plane or control-plane data that carries information bits.

In Example 60, the subject matter of any one of Examples 47 to 59 can optionally include wherein the first plurality of blocks of payload data are transport blocks (TBs).

In Example 61, the subject matter of any one of Examples 47 to 60 can optionally include wherein the one or more processors are further configured to select an overall pool of blocks of payload data to use for transmit beamsweeping over a plurality of candidate antenna beams that include the first candidate antenna beam and the second candidate antenna beam, assign a first subset of the overall pool of blocks of payload data to the first plurality of blocks of payload data, and assign a second subset of the overall pool of blocks of payload data to the second plurality of blocks of payload data.

In Example 62, the subject matter of Example 61 can optionally include wherein the one or more processors are configured to select the overall pool of blocks of payload data by selecting the overall pool of blocks of payload data based on a priority of data contained in the overall pool of blocks of payload data.

In Example 63, the subject matter of any one of Examples 47 to 62 can optionally include wherein the one or more processors are further configured to obtain information that indicates a quality of a wireless channel between the antenna array and the receiver device, select a padding ratio based on the quality of the wireless channel indicated by the information, and generate the first plurality of blocks of payload data to include a number of padding bits depending on the padding ratio.

In Example 64, the subject matter of Example 63 can optionally include wherein the padding bits are arbitrary bits that do not carry useful information, and wherein the padding ratio controls a ratio of padding bits to information bits in the first plurality of blocks of payload data.

In Example 65, the subject matter of Example 63 or 64 can optionally include wherein the information is an estimated pathloss of the wireless channel, an estimated propagation range of the wireless channel, or a timing advance of the wireless channel.

In Example 66, the subject matter of Example 64 or 65 can optionally include wherein the information includes the feedback on the first plurality of blocks and the second plurality of blocks that requests retransmission or a transmit power adjustment.

In Example 67, the subject matter of any one of Examples 63 to 65 can optionally include wherein the one or more processors are further configured to increase the padding ratio if the information indicates a decrease in the quality of the wireless channel, and to decrease the padding ratio if the information indicates an increase in the quality of the wireless channel.

In Example 68, the subject matter of any one of Examples 47 to 67 can optionally include wherein, when transmitting the payload data to the receiver device with the transmit antenna beam, the one or more processors are configured to configure the antenna array to transmit with the transmit antenna beam.

In Example 69, the subject matter of Example 68 can optionally include wherein the one or more processors are configured to configure the antenna array to transmit with the transmit antenna beam by setting a plurality of phase shifters to a set of beamforming weights for the transmit antenna beam, wherein the plurality of phase shifters connect to different antenna elements of the antenna array.

Example 70 is a non-transitory computer readable medium storing instructions that, when executed by one or more processors of a wireless device, cause the wireless device to perform the method of any one of Examples 1 to 23.

Example 71 is a wireless device including one or more processors, and a memory storing instructions that, when executed by the one or more processors, cause the wireless device to perform the method of any one of Examples 1 to 23.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A digital processing chip arrangement comprising:
a digital transmitter configured to transmit, via an antenna array, a first plurality of blocks of payload data with a first antenna beam, and to transmit, via the antenna array, a second plurality of blocks of payload data with a second antenna beam;
a digital receiver configured to receive, via the antenna array, feedback on the first plurality of blocks and the second plurality of blocks that requests retransmission or transmit power adjustment; and
a controller configured to select, based on the feedback, a transmit antenna beam,
wherein the digital transmitter is further configured to transmit, via the antenna array, payload data with the transmit antenna beam.

2. The digital processing chip arrangement of claim 1, wherein the feedback comprises one or more acknowledgements (ACKs) or negative acknowledgements (NACKs) that indicate whether a receiver device successfully received the first plurality of blocks of payload data or the second plurality of blocks of payload data.

3. The digital processing chip arrangement of claim 1, wherein the controller is further configured to determine, based on the feedback, retransmission rates for a plurality of candidate antenna beams that comprise a first candidate antenna beam and a second candidate antenna beam,
and wherein the controller is configured to select the transmit antenna beam by:
identifying, from the plurality of candidate antenna beams, a candidate transmit antenna beam that has the lowest retransmission rate, and
selecting the identified candidate transmit antenna beam as the transmit antenna beam.

4. The digital processing chip arrangement of claim 1, wherein the feedback comprises one or more transmit power adjustments that request the digital signal processing chip arrangement to increase or decrease its transmit power.

5. The digital processing chip arrangement of claim 1, wherein the digital receiver is further configured to receive transmit power adjustments for a plurality of candidate antenna beams that comprise a first candidate antenna beam and a second candidate antenna beam,
and wherein the controller is configured to select the candidate antenna beam as the transmit antenna beam based on the feedback by:

selecting, from the plurality of candidate antenna beams, the candidate antenna beam based on a number of positive power adjustments received for the candidate antenna beam.

6. The digital processing chip arrangement of claim 1, wherein the digital receiver is further configured to, before the digital transmitter transmits the first plurality of blocks of payload data, perform a receive beamsweeping procedure to select a receive antenna beam for receiving payload data from the receiver device,
and wherein the controller is configured to select a plurality of candidate antenna beams, comprising a first candidate antenna beam and a second candidate antenna beam, based on the receive antenna beam,
and wherein the controller is configured to select the candidate antenna beam from the plurality of candidate antenna beams based on the feedback.

7. The digital processing chip arrangement of claim 1, wherein the payload data is user-plane or control-plane data that carries information bits.

8. The digital processing chip arrangement of claim 1, wherein the controller is further configured to:
select an overall pool of blocks of payload data to use for transmit beamsweeping over a plurality of candidate antenna beams that comprise a first candidate antenna beam and a second candidate antenna beam;
assign a first subset of the overall pool of blocks of payload data to the first plurality of blocks of payload data; and
assign a second subset of the overall pool of blocks of payload data to the second plurality of blocks of payload data.

9. The digital processing chip arrangement of claim 8, wherein the controller is configured to select the overall pool of blocks of payload data by:
selecting the overall pool of blocks of payload data based on a priority of data contained in the overall pool of blocks of payload data.

10. The digital processing chip arrangement of claim 1, wherein the controller is further configured to:
obtain information that indicates a quality of a wireless channel between the antenna array and a receiver device;
select a padding ratio based on the quality of the wireless channel indicated by the information; and
generate the first plurality of blocks of payload data to include a number of padding bits depending on the padding ratio.

11. The digital processing chip arrangement of claim 10, wherein the padding bits are arbitrary bits that do not carry useful information, and wherein the padding ratio controls a ratio of padding bits to information bits in the first plurality of blocks of payload data.

12. The digital processing chip arrangement of claim 10, wherein the controller is further configured to increase the padding ratio based on the information indicating a decrease in the quality of the wireless channel, and to decrease the padding ratio based on the information indicating an increase in the quality of the wireless channel.

13. The digital processing chip arrangement of claim 1, wherein, when the digital transmitter transmits the payload data to a receiver device with the transmit antenna beam, the controller is configured to configure the antenna array to transmit with the transmit antenna beam.

14. A wireless device comprising:
a radio frequency transceiver;
an antenna array; and
one or more processors configured to transmit and receive signals with the radio frequency transceiver and the antenna array, and further configured to:
transmit, with a first antenna beam, a first plurality of blocks of payload data;
transmit, with a second antenna beam, a second plurality of blocks of payload data;
receive from a receiver device, feedback on the first plurality of blocks and the second plurality of blocks that requests retransmission or transmit power adjustments;
select, based on the feedback, an antenna beam as a transmit antenna beam; and
transmit payload data to the receiver device with the transmit antenna beam.

15. The wireless device of claim 14, wherein the one or more processors are further configured to determine, based on the feedback, retransmission rates for a plurality of candidate antenna beams that comprise a first candidate antenna beam and a second candidate antenna beam,
and wherein the one or more processors are configured to select the transmit antenna beam by:
identifying, from the plurality of candidate antenna beams, a candidate transmit antenna beam that has the lowest retransmission rate, and
selecting the identified candidate transmit antenna beam as the transmit antenna beam.

16. The wireless device of claim 14, wherein the one or more processors are further configured to receive transmit power adjustments for a plurality of candidate antenna beams that comprise a first candidate antenna beam and a second candidate antenna beam,
and wherein the one or more processors are configured to select the candidate antenna beam as the transmit antenna beam based on the feedback by:
selecting, from the plurality of candidate antenna beams, the candidate antenna beam based on a number of positive power adjustments received for the candidate antenna beam.

17. The wireless device of claim 14, wherein the one or more processors are further configured to:
obtain information that indicates a quality of a wireless channel between the antenna array and a receiver device;
select a padding ratio based on the quality of the wireless channel indicated by the information; and
generate the first plurality of blocks of payload data to include a number of padding bits depending on the padding ratio.

18. A method of performing beamsweeping at a wireless device, the method comprising:
transmitting, with a first candidate antenna beam, a first plurality of blocks of payload data;
transmitting, with a second candidate antenna beam, a second plurality of blocks of payload data;
receiving, from a receiver device, feedback on the first plurality of blocks and the second plurality of blocks that requests retransmission or a transmit power adjustment;
selecting, based on the feedback, a candidate antenna beam as a transmit antenna beam; and
transmitting payload data to the receiver device with the transmit antenna beam.

19. The method of claim 18, further comprising:
determining, based on the feedback, retransmission rates for a plurality of candidate antenna beams that comprise a first candidate antenna beam and a second candidate antenna beam; and selecting the transmit antenna beam by:
- identifying, from the plurality of candidate antenna beams, a candidate transmit antenna beam that has the lowest retransmission rate, and
- selecting the identified candidate transmit antenna beam as the transmit antenna beam.

20. The method of claim 18, further comprising:

obtaining information that indicates a quality of a wireless channel between the wireless device and the receiver device;

selecting a padding ratio based on the quality of the wireless channel indicated by the information; and generating the first plurality of blocks of payload data to include a number of padding bits depending on the padding ratio.

\* \* \* \* \*